(12) United States Patent
Simpson et al.

(10) Patent No.: US 7,073,131 B2
(45) Date of Patent: Jul. 4, 2006

(54) GROUP COMPOSITION STORE

(75) Inventors: Shell S. Simpson, Boise, ID (US); Ward S. Foster, Boise, ID (US); Kris R. Livingston, Boise, ID (US)

(73) Assignee: Hewlett-Packard Development Company, l.P., Houston, TX (US)

( * ) Notice: Subject to any disclaimer, the term of this patent is extended or adjusted under 35 U.S.C. 154(b) by 600 days.

(21) Appl. No.: 09/923,957

(22) Filed: Aug. 8, 2001

(65) Prior Publication Data

US 2003/0030667 A1   Feb. 13, 2003

(51) Int. Cl.
*G09G 5/00* (2006.01)

(52) U.S. Cl. .................. 715/744; 715/733; 715/738

(58) Field of Classification Search ............. 345/745, 345/744, 740, 738, 739, 530; 709/203; 715/734, 715/736, 744, 738, 733
See application file for complete search history.

(56) References Cited

U.S. PATENT DOCUMENTS

| | | | | |
|---|---|---|---|---|
| 5,025,395 A * | 6/1991 | Nose et al. | ................. | 345/745 |
| 5,060,135 A * | 10/1991 | Levine et al. | ................ | 345/769 |
| 5,870,546 A | 2/1999 | Kirsch | | |
| 6,029,182 A | 2/2000 | Nehab et al. | | |
| 6,123,362 A * | 9/2000 | Squilla et al. | ................ | 283/67 |
| 6,247,021 B1 | 6/2001 | Himmel et al. | | |
| 6,434,579 B1 * | 8/2002 | Shaffer et al. | .............. | 715/520 |
| 6,452,689 B1 | 9/2002 | Srinivasan | | |
| 6,452,692 B1 | 9/2002 | Yacoub | | |
| 6,564,202 B1 * | 5/2003 | Schuetze et al. | ............... | 707/2 |
| 6,567,122 B1 | 5/2003 | Anderson et al. | | |
| 6,581,058 B1 * | 6/2003 | Fayyad et al. | ................. | 707/6 |
| 6,584,480 B1 | 6/2003 | Ferrel et al. | | |
| 6,623,527 B1 | 9/2003 | Hamzy | | |
| 6,697,837 B1 * | 2/2004 | Rodov | ........................ | 709/203 |
| 6,721,802 B1 | 4/2004 | Wright et al. | | |
| 6,771,290 B1 * | 8/2004 | Hoyle | ........................ | 715/745 |
| 2002/0026359 A1 * | 2/2002 | Long et al. | ................... | 705/14 |
| 2002/0036793 A1 | 3/2002 | Roosen et al. | | |
| 2002/0097259 A1 * | 7/2002 | Marshall et al. | ............ | 345/738 |
| 2002/0135613 A1 * | 9/2002 | O'Hara | ...................... | 345/745 |
| 2002/0138564 A1 | 9/2002 | Treptow et al. | | |
| 2003/0009672 A1 | 1/2003 | Goodman | | |

\* cited by examiner

*Primary Examiner*—Cao (Kevin) Nguyen
*Assistant Examiner*—Ting Zhou

(57) ABSTRACT

A system for web based imaging comprising: at least one graphic store for storing a plurality of different graphics; a group composition store for storing a plurality of compositions, with each different composition referencing at least one graphic in a graphic store that is external to the group composition store and including data to place the referenced graphic within the composition; and a plurality of different user profiles, each for a different imaging client, with each user profile including a reference to the group composition store.

12 Claims, 12 Drawing Sheets

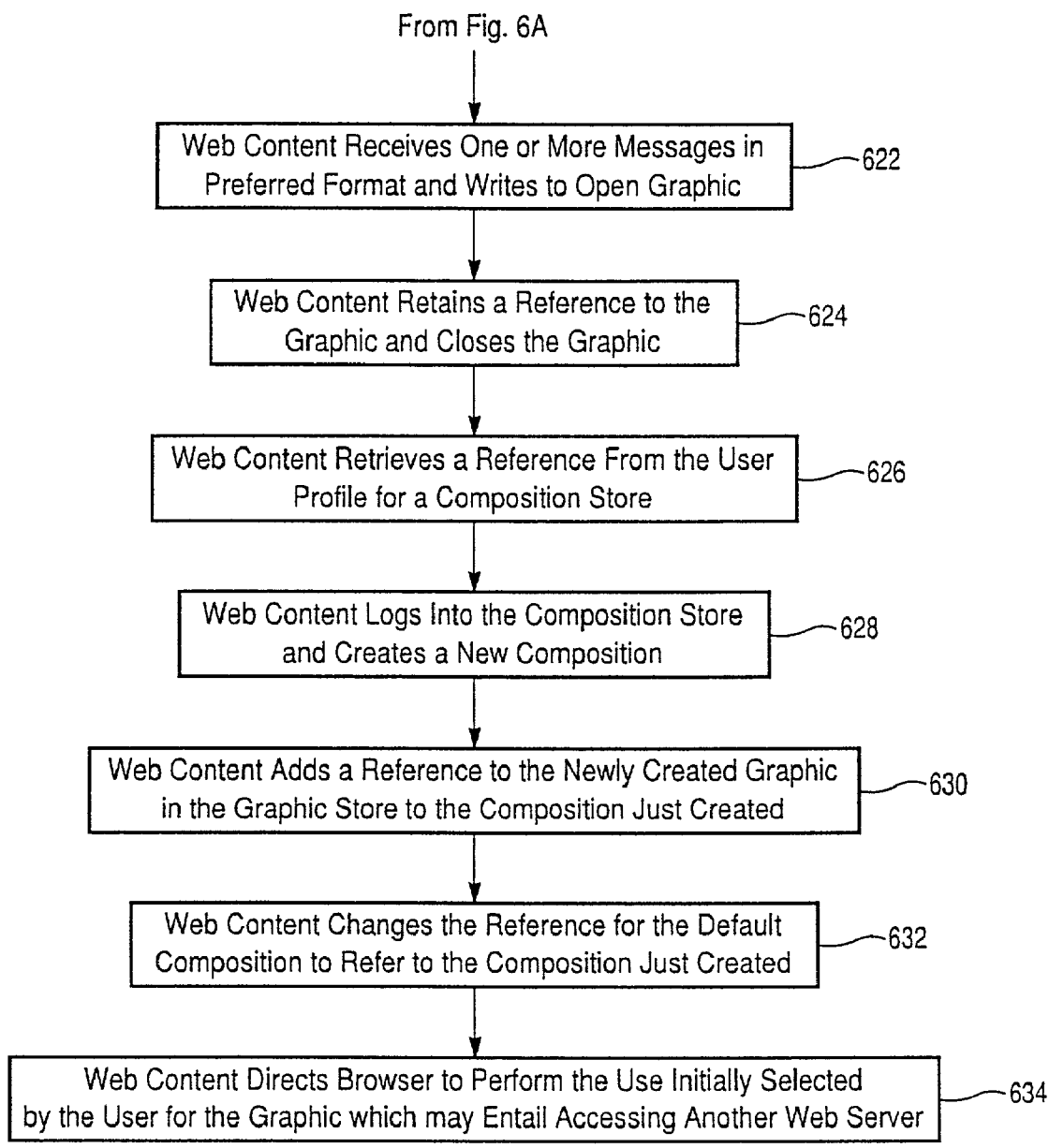

US 7,073,131 B2

GROUP COMPOSITION STORE

FIELD OF THE INVENTION

The present invention generally relates to an improved method, system and program product for performing web imaging operations, and more particularly, to such operations using a group composition store.

The use of web applications has been growing over the years as the Internet becomes more sophisticated. Because most web applications are designed to work with cross-platform browsers, they operate independently from the operating system ("OS"). In other words, most web applications can work with any operating systems, such as LINUX®, WINDOWS®, or MACINTOSH®. A specific problem arises in obtaining an efficient organization of stores that will permit different users sharing the same set of compositions

BRIEF SUMMARY OF THE INVENTION

Briefly, the present invention comprises, in one embodiment, a system for web based imaging comprising: at least one graphic store for storing a plurality of different graphics; a group composition store for storing a plurality of compositions, with each different composition referencing at least one graphic in a graphic store that is external to the group composition store and including data to place the referenced graphic within the composition; and a plurality of different user profiles, each for a different imaging client, with each user profile including a reference to the group composition store.

In a further aspect, the present invention includes a default graphics store for at least one of the imaging clients; a default composition store for the at least one imaging client, including a composition therein with a reference to a graphic within a graphics store; and wherein the user profile for the at least one imaging client includes a reference to the default graphic store and the default composition store.

In yet a further aspect of the present invention, one or more of the user profiles include a reference to a default composition within the group composition store.

In yet a further aspect of the present invention, the system includes a firewall protecting the plurality of imaging clients; and wherein at least one composition in the group composition store references a graphic outside of the firewall.

In yet a further aspect of the present invention, the group composition store contains a method that prevent at least selected ones of the imaging clients from deleting or modifying at least one composition in the group composition store.

In yet a further aspect of the present invention, the system comprises a web extension that will enumerate compositions stored in the group composition store as available to the imaging client.

In a further embodiment of the present invention, a program product is provided that includes machine readable program code for implementing: at least one graphic store for storing a plurality of different graphics; a group composition store for storing a plurality of compositions, with each different composition referencing at least one graphic in a graphic store that is external to the group composition store and including data to place the referenced graphic within the composition; and a plurality of different user profiles, each for a different imaging client, with each user profile including a reference to the group composition store.

BRIEF DESCRIPTION OF THE DRAWINGS

FIGS. 6A and 6B are a flow chart illustrating the preferred functionality of the transfer method of the present invention.

GLOSSARY OF TERMS AND ACRONYMS

Figure 1:
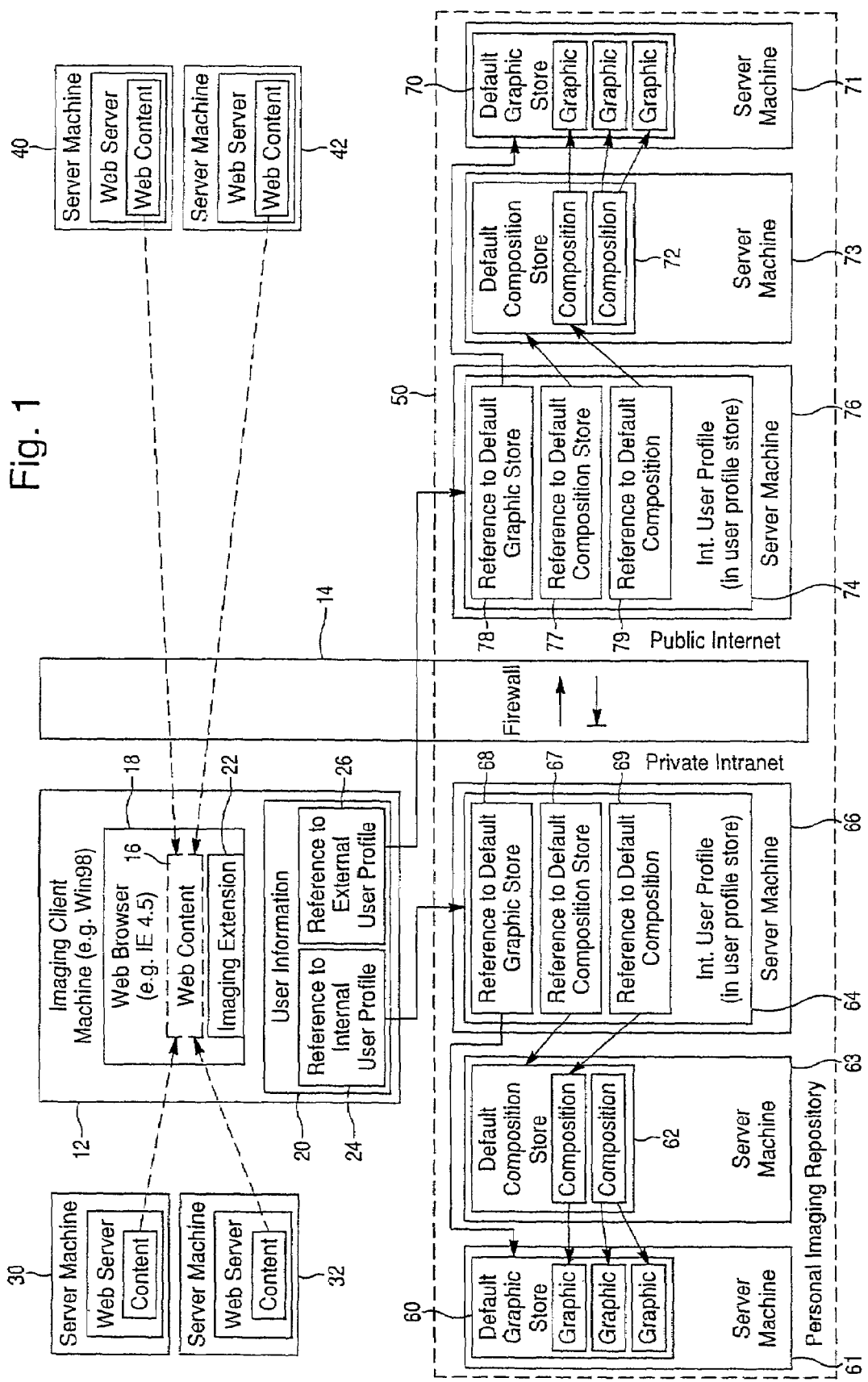
FIG. 1 is an architectural diagram of a client-server network system in which the present invention can be implemented.

The following terms and acronyms are used throughout the detailed description:

"API". An application programming interface (API) is a library of programmatic methods provided by a system of some kind (an example is a web-based imaging system, as in the present invention) that enables client programs (web content operating within the browser is one example) to interact with that system. One method of creating an API is to create a library. For example, in Java, a library (conventionally called a jar file) is created by defining a class or classes, compiling the class or classes, and grouping the class or classes into a library. For example, the following class could be created:

class BaseConversionAPI {static public String convertBaseToBase(
String inNumber, int inBase, int outBase) {// Code for returning a string representing inNumber converted to outBase}}

That class would then be compiled with the command:
java.exe BaseConversionAPI.java.

NOTE: Programs are typically stored in text files, which are "compiled" in order to create "object files" which contain the executable (or interpretable) instructions. In this case, the program is contained in the file BaseConversionAPI.java. The act of compiling creates a file named "BaseConversionAPI.class" containing instructions for a specific computing architecture (in this case the Java Virtual Machine) corresponding to the program.

Next in this example, a Jar file would be created:
jar.exe cvf BaseConversionAPI.tar BaseConversionAPI.class This command creates a "library" file containing the BaseConversionAPI class. This last step is not absolutely required. In some instances, APIs are provided as files containing executable instructions (such as the BaseConversionAPI.class file).

References regarding the creation of APIs:

http://www.library.yale.edu/orbis2/public/activity/API.html

Note that the APIs to networks services (graphic store, composition store, and user profile store, all to be discussed below) would be created to be accessible through a remote invocation technology such as CORBA, JAVA-RMI, DCOM, RPC, or SOAP. A wide variety of printed references are available that describe how APIs can be created to be accessible through a remote invocation technology, such as one of the technologies noted above.

Although libraries are referred to as APIs through out this patent, it is important to realize that an API is not really a library; an API is an interface that a library implements. However, to simplify the text in this patent an API and the implementation of an API as a library will be used interchangeably.

"Client-Server". A model of interaction in a distributed system in which a program at one site sends a request to a program at another site and waits for a response. The requesting program is called the "client," and the program which responds to the request is called the "server." In the context of the World Wide Web (discussed below), the client is a "Web browser" (or simply "browser") which runs on the computer of a user; the program which responds to browser requests by serving Web pages, or other types of Web content, is commonly referred to as a "Web server."

"Composition." Composition, also referred to as a "graphics composition," comprises a file with links to graphic data serviced as a single unit, i.e., a graphic. The file also usually includes information on the placement of those graphics on a sequence of canvases. It describes how to combine one or more graphics from one or more sources onto a sequence of canvasses, in a variety of different ways. The use of compositions allows multiple compositions to reference a graphic in a graphic store without having to duplicate the graphic.

"Composition store". Composition store refers to a service (ideally implemented as a network service) that stores and provides access to imaging composition(s) that can be accessed by the user or web services. In this context, providing "access" includes providing methods for building compositions, modifying compositions, and accessing them piecemeal. For example, a set of methods available for execution via the composition store might include the methods Get a Composition, Create a Composition, Delete a Composition, and Modify a Composition.

"Content". A set of executable instructions that is served by a server to a client and that is intended to be executed by the client so as to provide the client with certain functionality. Web content refers to content that is meant to be executed by operation of a Web browser. Web content, therefore, may non-exhaustively include one or more of the following: HTML code, SGML code, XML code, XSL code, CSS code, Java applet, JavaScript and C-"Sharp" code.

"Exchange infrastructure." An exchange infrastructure is a collection of services distributed throughout a network that stores imaging data associated with a particular user through a user profile.

"Firewall." A firewall filters out unwanted communication packets in one or more directions. By way of example but not by way of limitation, in one implementation of a firewall, requests from inside a firewall may be made to access data on the outside of the firewall, and responses to such requests are typically permitted. Communications initiated from outside the firewall to devices inside of the firewall are typically not permitted. Generally, the firewall may be implemented by a firewall proxy server that allows devices inside the firewall to pass HTTP requests to web servers outside the firewall. Obviously, other protocols may be used to implement communication through the firewall.

"Generic access instructions." A generic access instruction refers to an executable instruction that is intended to cause the executing device to generate generic access requests in order to access a set of graphics data. These instructions call methods provided by, for example, an imaging extension. Methods provided by the environment in which the program is executed are typically called an "Application Programming Interface" (API). Note that a generic access instruction does not include the location of the target graphic data. Typically, the target graphic data is pre-selected (generally by a user) and its location is determined from information that is maintained locally within the executing device.

"Hyperlink." A navigational link from one document to another, from one portion (or component) of a document to another, or to a Web resource, such as a Java applet. Typically, a hyperlink is displayed as a highlighted word or phrase that can be selected by clicking on it using a mouse to jump to the associated document or document portion or to retrieve a particular resource.

"Hypertext System." A computer-based informational system in which documents (and possibly other types of data entities) are linked together via hyperlinks to form a user-navigable "web."

"Graphics data." Graphics data refers to digital data capable of being represented as two or more dimensional graphics, such as a Portable Document Format ("PDF") file or a Joint Photographic Experts Group ("JPEG") file.

"Graphics store." Graphics store refers to a network service or a storage device for storing graphics data that can be accessed by the user or other network services. The graphics data store preferably accepts the graphics data in multiple standard file formats, and the graphics data is converted into these file formats when necessary depending on the implementation.

"Internet." A collection of interconnected or disconnected networks (public and/or private) that are linked together by a set of standard protocols (such as TCP/IP and HTTP) to form a global, distributed network. (While this term is intended to refer to what is now commonly known as the Internet, it is also intended to encompass variations which may be made in the future, including changes and additions to existing standard protocols.)

"World Wide Web" ("Web"). Used herein to refer generally to both (i) a distributed collection of interlinked, user-viewable hypertext documents (commonly referred to as Web documents or Web pages) that are accessible via the Internet, and (ii) the client and server software components which provide user access to such documents using standardized Internet protocols. Currently, the primary standard protocol for allowing applications to locate and acquire Web documents is HTTP, and the Web pages are encoded using HTML. However, the terms "Web" and "World Wide Web" are intended to encompass WAP and WML for mobile phone web browsers, as well as other current and future markup languages and transport protocols which may be used in place of (or in addition to) HTML and HTTP.

"Web Site." A computer system that serves informational content over a network using the standard protocols of the World Wide Web. Typically, a Web site corresponds to a particular Internet domain name, such as "HP.com," and includes the content associated with a particular organization. As used herein, the term is generally intended to encompass both (i) the hardware/software server components that serve the informational content over the network, and (ii) the "back end" hardware/software components, including any non-standard or specialized components, that interact with the server components to perform services for Web site users. Importantly, a Web Site can have additional functionality, for example, a Web site may have the ability to print documents, scan documents, etc.

"HTML" (HyperText Markup Language). A standard coding convention and set of codes for attaching presentation and linking attributes to informational content within documents. (HTML 2.0 is currently the primary standard used for generating Web documents.) During a document authoring stage, the HTML codes (referred to as "tags") are embedded within the informational content of the document. When the Web document (or HTML document) is subsequently transferred from a Web server to a browser, the codes are interpreted by the browser and used to display the document. Additionally in specifying how the Web browser is to display the document, HTML tags can be used to create links to other Web documents (commonly referred to as "hyperlinks"). For more information on HTML, see Ian S. Graham, The HTML Source Book, John Wiley and Sons, Inc., 1995 (ISBN 0471-11894-4).

"HTTP" (HyperText Transport Protocol). The standard World Wide Web client-server protocol used for the exchange of information (such as HTML documents, and client requests for such documents) between a browser and a Web server. HTTP includes a number of different types of messages which can be sent from the client to the server to request different types of server actions. For example, a "GET" message, which has the format GET <URL>, causes the server to return the document or file located at the specified URL.

"URL" (Uniform Resource Locator). A unique address which fully specifies the location of a file or other resource on the Internet or a network. The general format of a URL is protocol: //machine address:port/path/filename.

"User Information." User information is identification and security information used in accessing graphics composition(s) and graphics data associated with a particular user profile. It is preferably accessed either directly or indirectly through methods provided by an extension component integrated into the web browser.

"PDA" (Personal Digital Assistant). A small hand-held computer used to write notes, track appointments, manage email and browse the web, generally with far less storage capacity than a desktop computer.

"Personal imaging repository" A personal imaging repository is a conceptual term describing the exchange infrastructure used to exchange graphics composition and graphics data with web services. Users are associated with their graphics data through user profiles. It should be noted that the personal imaging repository can represent any type or combination of data storage devices.

"Reference" A reference is intended to be a generic term that includes a URL reference, or in some cases a pointer, socket number or other backroom detail, to another internal or external location.

"Web service" A web service is intended to refer to a service that is provided (at least in part) by a web server. But a web service is a broader concept than a web server. In this regard, a "Web server" is a program that, using the client/server model and the World Wide Web's Hypertext Transfer Protocol (Hypertext Transfer Protocol), serves the files that form Web pages to Web users (whose computers contain HTTP clients that forward their requests). Every computer on the Internet that contains a Web site must have a Web server program. The most popular Web servers currently are Microsoft's Internet Information Server (Internet Information Server), which comes with the Windows NT server; Netscape FastTrack and Enterprise servers; and Apache, a Web server for UNIX-based operating systems. Other Web servers include Novell's Web Server for users of its NetWare operating system and IBM's family of Lotus Domino servers, primarily for IBM's OS/390 and AS/400 customers.

Web servers often come as part of a larger package of Internet- and intranet-related programs for serving e-mail, downloading requests for File Transfer Protocol files, and building and publishing Web pages. This larger package is referred to as the web service. Parameters for a Web server include how well it works with various operating systems and other servers, its ability to handle server-side programming, and publishing, search engines, and site building tools in the package.

"XML" XML (Extensible Markup Language) is a flexible way to create common information formats and share both the format and the data on the World Wide Web, intranets, and elsewhere. XML is "extensible" because, unlike HTML, the markup symbols are unlimited and self-defining. XML is a simpler and easier-to-use subset of the Standard Generalized Markup Language (SGML), the standard for how to create a document structure. XML is similar to the Hypertext Markup Language (HTML). Both XML and HTML contain markup symbols to describe the contents of a page or file. HTML, however, describes the content of a Web page (mainly text and graphic images) only in terms of how it is to be displayed and interacted with. For example, the letter "p" placed within markup tags starts a new paragraph. XML describes the content in terms of what data is being described. For example, the word "phonenum" placed within markup tags could indicate that the data that followed was a phone number. This means that an XML file can be processed purely as data by a program or it can be stored with similar data on another computer or, like an HTML file, that it can be displayed.

DETAILED DESCRIPTION OF THE PREFERRED EMBODIMENTS

The following pending application is hereby incorporated by reference, in its entirety: "SYSTEM AND METHOD FOR PROCESSING DATA IN A DISTRIBUTED SYSTEM" by Shell Simpson and Philip Verghese, Ser. No. 09/712336 filed on Nov. 13, 2000.

An example of a client-server architecture in which the present invention can be implemented is shown in FIG. 1.

The present invention, in one aspect, is directed to implementing the concept of allowing a user's information to follow him/her around, i.e., be accessible from a variety of different locations, both inside a firewall and outside of the firewall, as well as from a variety of different machines. This concept is implemented using one or more user profiles 24 and 26 in combination with the concept of a personal imaging repository 50 for storing user graphics across a distributed environment. The personal imaging repository 50 can be distributed across multiple locations, multiple machines and multiple architectures. For example, some graphic information might be stored in a local graphics store 60 behind a firewall 14, while other graphics might be stored in external graphics stores 70 outside of the firewall 14. One such local or external graphics store could be on the user's hard drive. Another local or external graphics store could be the hard disk storage for a multi-functional peripheral, such as a printer/copier/fax machine. Another local or external graphics store might be on an Intranet server, or an Internet server. The actual storage location is determined according to user preference and application. Thus, graphics information gathered from the multi-function peripheral device could stay in a graphics store on that device and be subject to access by the user, thereby improving performance. Likewise, graphics information intended for Internet destinations might be stored in a graphics store on a server accessible via the Internet. Graphics information, where wide accessibility is desired, might be stored on the Internet. From the perspective of imaging destinations, i.e., web sites that use graphics information, all available information would be available without special knowledge. In the present discussion, the term "graphic" is intended to mean any image, including a text image, a photo image, PDF files and anything else that can be represented in two or more dimensional graphics. For further information, see the definition for "graphics data" in the definition section. For further information on the meaning of a "graphics store," see the detailed discussion below.

For purposes of an overview of FIG. 1, an imaging client machine 12 is shown behind a firewall 14. The imaging client 12 may access by means of a browser 18 web content 16 obtained from servers 30 and 32 inside the firewall 14, and web content obtained from servers 40 and 42 outside of the firewall. The imaging client may store graphics obtained from this web content in its personal imaging repository 50, in the form or context of a composition (see the definition of "composition" above), either inside or outside of the firewall 14.

IMAGING EXTENSION. The imaging client 12 includes an imaging extension 22 (also shown as 922 in FIG. 9). The imaging extension 22 is configured to respond to the execution of generic access instructions from the web content 16 by generating/mapping to corresponding imaging client specific commands of the imaging client 12. However, this will only happen if user information 20 (containing references 24, 26 to the user's profiles 64, 74) is available to the imaging extension 22, to access the user's personal imaging repository 50.

The imaging extension 22 may be implemented/thought of as an application programming interface (API). The API used for the imaging extension is preferably in accordance with a system wide standard. The generic access instructions from the web content, when executed, may cause imaging extension API calls to be issued to the API in order to effect, via imaging client specific instructions, access to the user's personal imaging repository 50. It will be recognized that there are many other ways (both hardware and software) to implement this same functionality. The present invention is not limited to any one way. In essence, the imaging extension 22 is for accessing user information 20, and for providing an opaque interface between the web content 16 executing in the browser 18 and the personal imaging repository 50 and other functionality of the imaging client. An example implementation of the imaging extension will be discussed in more detail below.

The user information 20 in FIG. 1 comprises at least one or more references to one or more user profiles. Each reference would, by way of example but not by way of limitation, be implemented by a URL reference, or in some cases a pointer, socket number or other backroom detail. The reference for the user profile could be to a location within the imaging client itself, or to a location external to the imaging client, such as the server 66 or the server 76 shown in FIG. 1. In FIG. 1 the user information 20 includes a reference 24 to an internal user profile 64 and a reference 26 to an external user profile 74 that are located in a servers 66 and 76, respectively.

Each referenced user profile 64 and 74 might include user identification information and at least a reference to all or a portion of a personal imaging repository 50 for that user profile. As noted above, a reference may include a URL reference (or pointer, socket or other backroom detail) to one or more composition stores. In the example of FIG. 1, the internal user profile 64 includes a reference 67 to a default composition store 62 on a separate server 63. Additionally, the internal user profile 64 includes a reference 68 to a default graphics store 60 on a separate server 61, and a reference 69 to a default composition within some composition store, which could be the default composition store 62. Note that unlike the default composition store reference 67 and the default graphic store reference 68, which generally do not change and are used by the imaging extension to locate the default graphic store service and default composition store service, the default composition reference 69, in many embodiments, is intended to change often. It is a reference to the composition that is accessed by "default" by "imaging destination services". Imaging source services typically ignore the existing value of a default composition reference 69 and are only interested in changing the value of default composition reference 69 so that it refers to a composition created by the imaging source service.

Note also, that in general, the profile references will determine which compositions will be enumerated/are available to the user using that profile.

Likewise, in FIG. 1 there is also shown the reference 26 to the external user profile 74. In FIG. 1, the external user profile is disposed on the server 76 external to the imaging client 12 and external to the firewall 14. Note that typically the firewall provides the boundary between a private intranet and the public Internet. The external user profile 74 includes a reference 77 to a default composition store 72 on a server 73 that is external to the firewall 12, a reference 78 to a default graphics store 70 on a server 71 that is likewise external to the firewall 14, and a reference 79 to a default composition in the default external composition store 72 or another composition store external to the firewall.

It should be noted that there may be multiple internal and/or external user profiles, selectable automatically or manually based on one or more criteria. For example, there could be a different internal and external user profile for each different imaging client that the user may use, with the particular internal or external user profile selected by providing the user identification information, other information including location information, and the imaging client machine information to the imaging extension 22.

Note that the same user can have multiple user profiles. This is particularly advantageous when firewalls are used. This is because, as noted above, different graphic stores and composition stores would be used, depending on whether the imaging client was inside the firewall or outside the firewall. Multiple user profiles for the same user may result in multiple personal imaging repository segments associated to that single user, each accessible via a different user profile. Note that multiple users in a group (each with their own personal imaging repository) can refer to the same imaging information using shared services, i.e., a group composition store, as noted above. Part of each user's personal imaging repository, in this scenario, can be shared by a group having a common association, such as a group project.

In order to select a user profile if more then one is provided, the imaging client 12 will include code (typically residing in the imaging extension 22, for example) for selecting one from the internal user profile 64 and the external user profile 74. In one embodiment, this could simply be implemented by code that provides a menu to the user of the imaging client 12 to allow the manual selection of the reference to the desired user profile. Alternatively, or in addition, the code could be implemented to automatically select the user profile based on a criteria such as the imaging client machine being used, or whether the imaging client is connected to a network inside the firewall 14 or is otherwise inside the firewall, or whether it is outside of the firewall 14.

In operation, in order to obtain the default composition store, the default graphics store, and the default composition, the web content invokes a method provided by the imaging extension 22 (the imaging extension API). The imaging extension 22, in turn, obtains a reference to the appropriate user profile in an imaging client profile store in the user information section 20 and invokes (using remote invocation technologies like CORBA, SOAP, etc.) methods provided by the profile store for the purpose of obtaining the default composition store, default graphic store, or default composition.

Profile Store. Note that the profile store is simply a service in the user information section 20 that includes appropriate methods to create, modify, access, and cancel profiles in a profile storage. Such a user profile store service might include data, i.e., one or a plurality of user profiles, and a plurality of typical methods for accessing and modifying the stored user profiles. For example, the service might include methods entitled "Get a User Profile," "Modify a User Profile," and "Delete a User Profile." Accordingly, the imaging extension API will map to the appropriate methods in the user profile store in which the user profile is stored in order to obtain the reference to the items (such as default graphic store, default composition store, and default composition) in the user profile.

It should be noted that the imaging client, shown located inside of the firewall 12, can access web content outside the firewall from the web servers 40 and 42. Likewise, either user profile may reference composition stores and graphic stores outside the firewall 14.

Typically, each web server will serve different web content, depending on the services and graphics that it is offering. Each web content is pre-configured with specific executable instructions depending on the type of service the server machine provides. In this example, the web server 40 may be for a printing service, whereas the web server 30 may provide a special photo graphics service. Consequently, the web content from the server 30 may be very different from the web content from the server 40, with each including different executable instructions to the browser 18.

The user will typically initially store graphics that are to be operated on by a selected web service (a printer service, for example) in the user's personal imaging-repository, with the particular storage chosen within the user's personal imaging repository in accordance with the user profile that is active, or as manually selected by the user, or alternatively as selected by the web service or other application that is operating in the browser. By way of example, the user could store a graphic to be operated on in his/her personal imaging repository 50 inside of the firewall 14 in an internal graphics store, which could be the default internal graphics store 60. The particular internal graphic store used for this storage would be selected for example, either manually via a pop-up menu presentation to a user, or automatically by an imaging extension 22 that references and uses the information in one or more internal user profiles 64 on a server 66. As noted above, internal user profile 64 would typically include a reference 67, such as a uniform resource locator (URL) for example, to a default internal composition store 62, which could be any internal composition store selected by the user or the system. The internal user profile would also include a reference 68 to the default internal graphics store 60, which could again be any internal graphics store chosen by the user of the system. Additionally, the internal user profile would include a reference 69 to a default composition. This default composition would be the last internal composition selected by the user.

Alternatively, the user could choose to store the graphic to be operated on in a graphics store in the user's personal imaging repository 50 outside of the firewall 14, or this could be required because the imaging client 12 is outside of the firewall 14. This external graphics store could be a default external graphics store 70. Note that the particular graphics referenced by a composition in an external composition store will also be located external to the firewall. The particular external graphic store used for this storage would be selected, either manually via a pop-up menu, for example, or automatically by the imaging extension 22 that references and uses the information in the external user profile 74 on a server 76. As noted, the external user profile would include a reference 77, such as a URL for example, to the default external composition store 72, which could be any external composition store selected by the user or the system. The external user profile would also include a reference 78 to the default external graphics store 70, which could again be any external graphics store chosen by the user of the system. Additionally, the external user profile 74 would include a reference 79 to a default composition. This default composition would be the last external composition selected by the user.

The default composition could be set in a variety of ways. The two most common ways are: 1) the user previously selected a composition through an Internet Imaging home page, or through any other Internet service that displays a list of available compositions that the user may select. Once selected, the default composition reference in the user's profile is updated to refer to the selected composition. It is important to note that the Internet Imaging Home page is merely one example of a service that allows the user to choose which composition should be the default composition. Other web services could provide the same sort of capability; 2) the user interacted with a web service that created a new composition. Typically, web services (web server+web content running in a user's browser) that create new compositions want the new composition to be readily available (which is accomplished by making the newly created composition the default composition).

Thus, it is important to note that the user can implicitly or explicitly select the default composition in his/her profile. As noted above, the user can explicitly choose the default composition by interacting with a web service (such as an Internet Imaging Home service), which provides content capable of changing the "default composition". Alternatively, the user can implicitly select the default composition by interacting with web services that create new compositions and makes those new compositions the default composition in order to make the new composition readily available as the user subsequently browses to other web services.

As an example of default composition selection for use so that another web service may operate on a graphic, assume a graphics store on a camera server, which store contains photo graphics that the user wishes to print. The user browses to the camera's web page, wherein he/she chooses a desired photo image and retrieves that into the user's personal imaging repository, where it becomes a graphic in a new composition. This photo composition chosen by the user is now the default composition.

Figure 9:
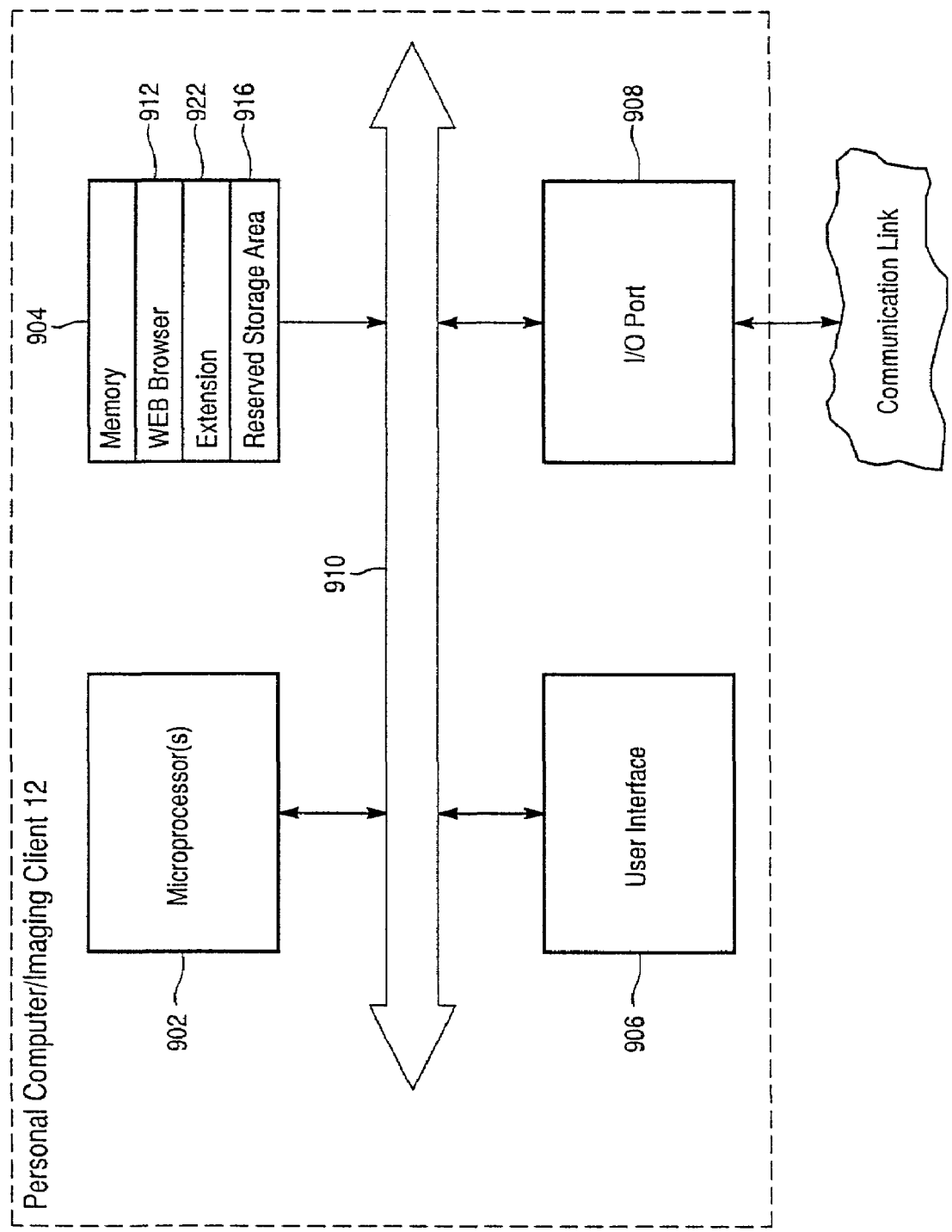
FIG. 9 is an architectural diagram of an example imaging client.

Referring now to the individual components, the imaging client, by way of example, but not by way of limitation, would typically include a configuration with a web browser 18, a storage module of some type 20 with user information and other information, an imaging extension 22, and some form of user interface (not shown), e.g., a keyboard and display device. Generally, the browser would be implemented under control of a microprocessor. An example imaging client 12, in the form of a personal computer, is shown in FIG. 9. FIG. 9 is a high level diagram of a personal computer/imaging client 12. As shown, the personal computer 12 includes a processor 902, a memory 904, the WEB browser 912, the imaging extension 922, a reserved storage area 916, and an input/output (I/O) port(s) 908. All of these components are connected by one or more local interfaces 910. The I/O port 908 links to the servers previously described. The processor 902 is used to execute the WEB browser 912.

Web Content. In operation, the browser 18 initially accesses a web site and using appropriate request commands (HTTP for the current generation of browsers), downloads therefrom web content. As noted by the definition herein, the web content 16 includes a set of executable instructions that are intended to be executed in the browser 18 so as to provide the imaging client 12 with predetermined functionality. These executable instructions comprise generic access instructions (see the definition above) which are system wide instructions, expressed in some language (e.g., Java) and that call the methods of an imaging extension API to access the user's personal imaging repository to perform web imaging operations. Such generic access instructions can be, by way of example but not by way of limitation, Java, JavaScript, C-sharp instructions. The system wide standard typically specifies "generic access instructions," "generic access requests," and "target graphics."

A variety of functionality could be provided by the web content. For example, the web content might include executable instructions for causing the imaging client 12 to display target graphics, i.e., show available graphics on the accessed web site. Another web content might include executable instructions for displaying a print button, and if the print button is clicked, causing the imaging client to generate a print job that describes a graphic in the personal imaging repository for the user and transmits the print job to a printer. It could also provide a preview of the target graphic. Accordingly, the web content 16 in FIG. 1 refers to a set of executable instructions that are downloaded into the browser 18 to perform a service requested by the user.

The web browser executes the web content, whether it is HTML interpreted/executed by the browser into marks displayed on a user's screen, or Java and JavaScript or some other appropriate language. As previously noted, the web content contains executable instructions that use the API provided by the imaging extension 22 to indirectly access the user's personal imaging repository. For example, the executable instructions of the web content might obtain an opaque access to the information from the user's profile (in order to specify the user's personal imaging repository) by interacting with a user profile store service in which the user's profile is located.

The executable instructions of the web content might perform this access in order to obtain an opaque reference to the reference 67 to the user's internal default composition store and an opaque reference to the reference 68 to the user's internal default graphics store. The web content might further use the API provided by the imaging extension 22 to add a new graphic to the internal default graphic store via this opaque reference to the reference 68.

Imaging Extension. In a preferred embodiment, the imaging extension 22 is constructed to prevent the web content 16 (i.e., the executable instructions from the web service), from directly accessing arbitrary services and the user's personal imaging repository. In essence, the web content uses the imaging extension as the gateway to access everything in the user's personal imaging repository, including the information in the user profile. In the discussion herein, the term "opaque reference" is used. An "opaque reference" is a reference that does not expose information about an underlying resource. The possessor of an opaque reference is unable to determine anything about the resource from the opaque reference or to modify the opaque reference so as to alter which resource is being referenced. (In contrast, if a URL is provided, for example, "http://www.hp.com", it would be fairly straightforward for the web content to modify the URL to refer to a different resource, for example, "http://www.xerox.com".)

This restricted access imposed on the web content can be implemented using a variety of methods. The designer can implement the API for the imaging extension 22 so that the API only accepts references from the web content that were previously provided thereto by the imaging extension 22. In essence, the imaging client/web content would not be able to arbitrarily supply references when calling the API provided by the imaging extension. The web content 16 (running on the imaging client 12), in order to communicate to imaging client resources and the user's personal imaging repository 50, must first obtain opaque references using the API of the imaging extension 22. For example, if the web content 16 wanted to access the default graphics store 60, the web content 16 would be required to call a method (provided by the API of the imaging extension 22) that provides an opaque reference to the default graphic store. This reference could then be used in subsequent calls by the web content to the API of the imaging extension 22.

By way of example but not by way of limitation, one approach to accomplishing this restriction would be to create a session. For example, an imaging extension API for a particular operation might comprise:

CreateParticularOperationSession( ): returns SessionID
PerformOperation( Parameter, SessionID id ): returns Boolean (which indicates a result)
DeleteParticularOperationSession(SessionID sessionID)

Accordingly, the web content would be required to call the imaging extension API to first create a session by calling CreateParticularOperationSession, which would return a SessionID. This SessionID would be used to subsequently refer to the particular session. Next, the web content would call the PerformOperation in the imaging extension API with particular input and the session id. The web content can then perform a variety of manipulations, but will not be able to directly access parameters and operations which are "associated" with the session id, because the association is accomplished in a way that is "opaque" to the client. The imaging extension API and that API alone knows how to use the session id to determine/map to imaging client parameters. Often, the session id will be a reference such as a pointer to a data structure containing information relevant to the session. This data structure might contain the parameters and other pertinent information. When the web content has completed its operation, the web content calls the DeleteParticularOperationSession in the imaging extension API with the session id as a parameter. This instructs the imaging extension API to free whatever resources (such as memory) are associated with the session. Note that if the web content changes the session id, that will not allow the web content to obtain the restricted parameters, but will only confuse the imaging extension with the previously unseen session id.

The API provided by the imaging extension may typically be implemented as a library of methods that provide controlled access to the APIs provided by the network services participating in the user's personal imaging repository. This imaging extension API is implemented so as to invoke the APIs provided by the user profile store, composition store, and graphic store. The API provided by the imaging extension is generally not accessed through remote invocation technology, although it may be implemented to use remote invocation technology to access the APIs provided by the network services participating in the user's personal imaging repository. The API provided by the imaging extension is not an exact replication of the APIs provided by the user profile store, composition store, and graphic store, since this API seeks to provide controlled access to those network services through (among other techniques) opaque references.

From the above example, it can be seen that the web content is prevented from using the API provided by the imaging extension to access arbitrary services. The key to this restriction is that the web content would not be able to supply the addresses for these arbitrary services. The web content would only be able to refer to services through opaque references provided by the imaging extension API (so as not to expose the actual reference/URL to the web content). For example, the web content might use the API to obtain a list of opaque references to available compositions. This list of opaque references would map to the real references/URLs in the imaging extension alone. Thus, in subsequently referring to these compositions, the web content would not be allowed to supply a URL (which might be one of its own creation), because that created URL would not map within the imaging extension to real resources. Instead, the web content would be required to use references provided to it by the API, which only make sense in the context of the current session with that API. Specific unusual aspects of the foregoing are that the code attempting to use particular resources is externally obtained web content, and the resources it is attempting to access/use are network services.

To state the foregoing in a different way, only references obtained through the imaging extension (by calling the API) can be subsequently used by web content. Other "made up" references are effectively treated as gibberish by the imaging extension 22.

The web content might start off by getting an opaque reference to the default composition store from the imaging extension (using the appropriate API). Later, the web content might use the opaque reference to the default composition store to obtain a set of references to content within the default composition store. These opaque references could, in turn, be used to obtain opaque references to the graphics associated with each composition, so that the web content obtains an opaque reference to each individual graphic. But it is important to note that each of these opaque references only makes sense in the context of the web content's interaction with the imaging extension. It's also important to note that only the opaque references originating from the imaging extension would be recognized by the imaging extension. (In a likely implementation, the "references" provided by the imaging extension would simply be gibberish strings of characters that only make sense to the imaging extension.)

Accordingly, the imaging extension prevents malicious web content from inappropriately accessing services. Note that the API of the imaging extension 22 typically does not supply references to actual resources, i.e., composition stores, user profile stores, located on the network, and it only accepts these references under controlled circumstances (such as when adding a reference for a graphic located in a website's graphic store to a composition).

As noted above, normally web content isn't allowed to supply URL's to the imaging extension. The reason for this is that if the web content were able to supply URL's, it could exploit this capability to attempt to inappropriately gain access to network services that the web content has no business trying to access. e.g., it could arbitrarily choose and "hack" graphic store services. Although normally inappropriate to allow web content to supply URL's to the imaging extension, there are some circumstances where it may make sense from a security and risk standpoint. As noted above, a web site supplying web content can have its own graphic store. The graphics in this graphic store (whether real or virtual) have URL's or other references that must be used in referencing these graphics. If the web content wants to create a composition that contains such a reference, it must have some way of supplying this reference to the imaging extension. Allowing web content to supply references to graphics coming from the same location as the web content is usually fairly benign. Thus, instead of allowing web content to arbitrarily choose any URL in the user's personal imaging repository, under the controlled situation of supplying a URL to the same web site as the web content or based on credentials, the web content may be allowed to supply the URL to the imaging extension. This allows web site provided graphics to be referenced, while still maintaining a reasonable level of security.

Accordingly, in the example of the web content desiring to create, host and use a graphic store on the web content's own web site's server, the web content may be permitted to add a reference to the graphics hosted by it's web site to a composition that the web content is creating or modifying. In this example, the web content would make use of an API method (a CreateOpaqueRefFromURL(Session, URL) in the imaging extension API—that would convert the URL of a graphic in the web site's graphic store into an opaque reference. The web content could then use the opaque reference to add the graphic to a composition. Access to this API method functionality would likely be based on the site's credentials or on a determination that the URL supplied from the web site is to the same web site as the web content that has originated this operation.

GRAPHIC STORE The present invention includes as an important aspect thereof the use of a graphic store configuration. The graphic store, in contrast to storage at a web server which operates to simply "GET" whatever data corresponds to a given URL, provides services that get/operate on/create/reformat/translate graphics. In one aspect of the invention, the graphic store can dynamically create graphics with current data by referencing data in common with associated web services. A given graphic store can provide remote storage for a user and can become part of the user's personal imaging repository, so that the user does not need to provide storage for a graphic he/she wishes to process/operate on. This aspect is particularly important for a user operating PDA's and other devices without high capacity storage capabilities—such as is typically required to store graphic data. Of great importance, the graphics store can provide the ability to communicate with the web content of various web services. For example, web content from a printer web service can ask questions of the graphics store, such as how many pages are in the graphic to be printed (typically, the web content would query the composition for the number of pages, which would in turn request this information from each graphic store that contains a graphic referenced in the composition, if required). The printer web content can also request that the pages of the graphic be transmitted in a desired order other than chronological order to thereby improve printer performance.

Figure 10:
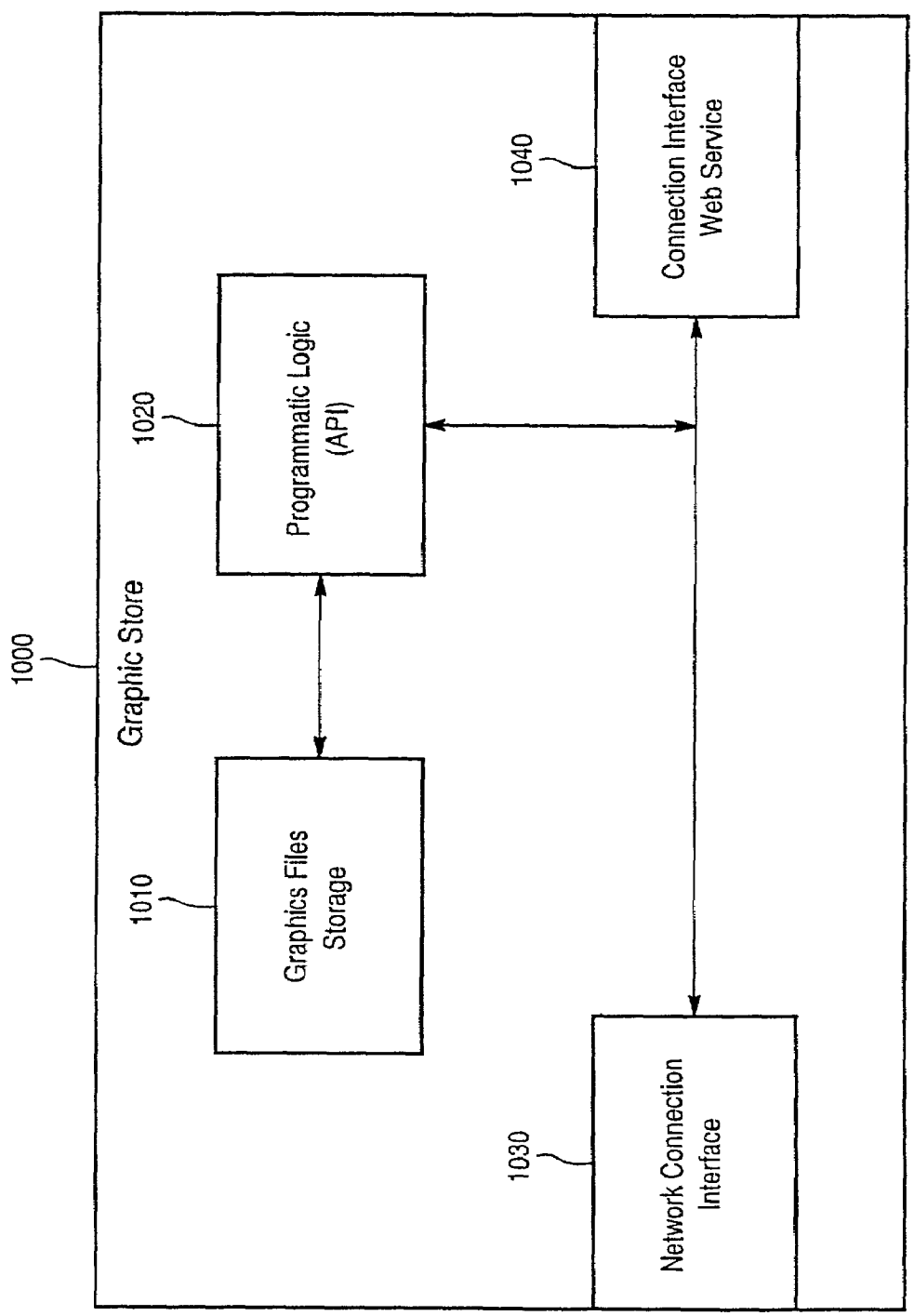
FIG. 10 is a schematic block diagram of one embodiment of a graphics store.

A graphic store can be implemented in a variety of ways, but there are two typical variations, each with slightly different elements:

Variation 1 (shown as graphic store 1000 in FIG. 10):
1) A storage 1010 for storing graphic files;
2) Programmatic logic 1020 implementing a graphic store interface (API) (used by web services and by clients in general). This logic provides a means of storing and retrieving graphics in the storage 1010;
3) A connection interface 1030 to a network (to which users are connected); and
4) A connection interface 1040 to the web service (which could be the same as the connection 1030 to the network, but might be different).

Variation 2 (shown as graphics store 1100 in FIG. 11):
1) Programmatic logic 1120 implementing a graphic store interface (API). This logic provides a means of satisfying requests for information and data including information and data relating to a "virtual" graphic. This logic uses a resource shared between the web server and the graphic store. This other shared resource could be another server on the network, for example a POP server for email.
2) A connection interface 1130 to the network (to which users are connected).
3) A connection interface 1150 to a resource which is shared between the web server and the graphics store (which could be the same as the connection to the network, but might be different).
4) An optional cache 1110 for storing graphics that are generated dynamically (when requested).

Figure 11:
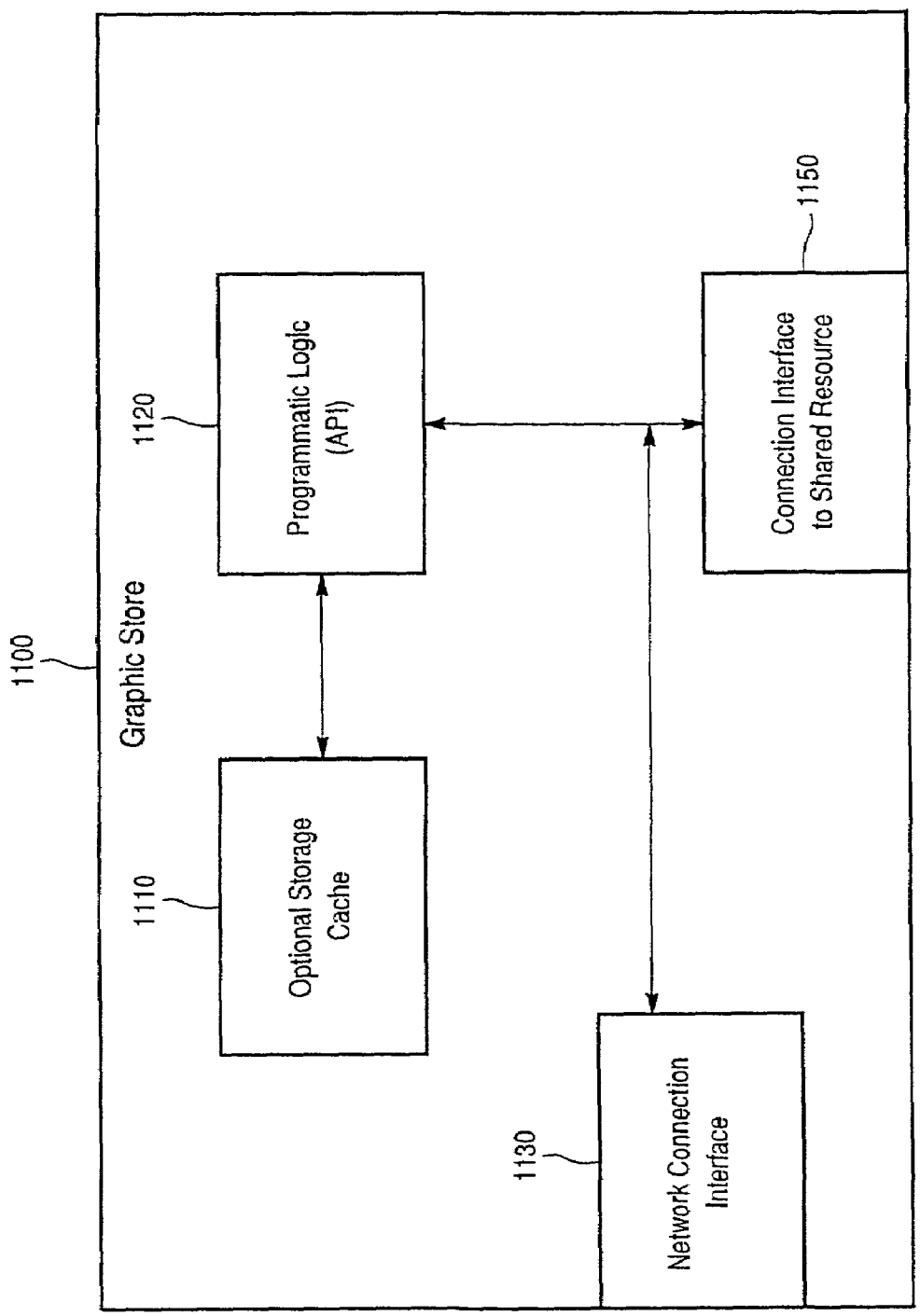
FIG. 11. Is a schematic block diagram of a second embodiment of a graphics store.

Note for FIG. 11, the connection between the web service and the graphic store may be indirect, through the specification of information about the shared resource that is placed by the web service in the URL referencing the desired graphic. The web service initially generates a URL that represents a virtual graphic, i.e., one that must be obtained/created by reference to a shared resource. Accordingly, the URL itself specifies the shared resource where the graphic may be obtained/created. This URL also specifies the graphic store where the virtual graphic can be accessed. When the user clicks on a button in the web content in the user's browser in order to obtain this graphic, the above noted URL for the graphic is referenced by the web content, and is subsequently supplied to the graphics store. The URL contains information about the shared resource (in addition to specifying the graphic store), which is later used to identify the shared resource. For example, the virtual graphic might be referenced by the URL http://graphicstore.webmail.com/msg?mailserver=imap.webmail.com&user=joe&msgid=12453. This URL has encoded within it several key pieces of information. It contains the identity of the graphic store, graphicstore.webmail.com, the identity of the mail server, imap.webmail.com, the identity of the user, joe, and the identity of the mail message, 12453. On receipt of this URL from the web content, the graphics store calls a method to interpret the URL and to generate a call to the shared resource to obtain/create the desired graphic.

For example, if the graphic store received a request for a thumbnail JPEG bitmap of page one of the virtual graphic referenced by http://graphicstore.webmail.com/msg?mailserver=imap.webmail.com&user=joe&msgid=12453, the graphic store would contact the email server imap.webmail.com using the IMAP protocol and request data regarding message 12453 for user joe. The graphic store would then convert the email message data into a thumbnail JPEG bitmap of page one and use that bitmap to satisfy the quest. The email message data might be converted into a series of pages using conventional mechanisms that allow text to be converted into printable graphics (i.e. PDF). The printable graphics could be converted into a bitmap using conventional mechanisms that allow print graphics to be converted into bitmaps (such as the open source Ghostscript graphics translator).

The graphic store interface (API) could take a variety of different forms depending on the services that the graphic store wishes to provide and the types of dialogue it wishes to support with web content. For example, it could take the form of:

a method or methods for determining information about a graphic, including (for example):
number of pages (or more generally speaking, canvases)
presence of color on any of the pages
do all the pages (or canvases) have the same size
a method or methods for determining what graphic formats the entire graphic in storage is available in, including (for example):
Postscript
PDF
PCL5
PCL6
PCL6 for the Color LaserJet 4500
a method or methods for obtaining the entire graphic in a graphic format the graphic is available in (graphic translation is handled implicitly so no explicit translate method is required);
a method or methods for determining the available page orders the entire graphic is available in and the graphic formats the graphic is available in for those page orders;
a method or methods for obtaining the entire graphic in an available page order in a graphic format the graphic is available in;
a method or methods for determining what graphic formats a page (i.e. canvas) of the graphic is available in, including (for example):
JPEG
GIF
PNG
Partial PDF
a method or methods for obtaining a page (i.e. canvas) of the graphic in a graphic format the page (i.e. canvas) is available in.

NOTE: The desired page order can be achieved by obtaining the entire graphic with the pages in the desired order or obtaining in the desired order each individual page.

Typically, the resource, as well as the web service associated with the graphics store, and the graphics store itself, each has its own reference, which may be a URL. The graphic store, as noted above, can provide remote storage for a user that has downloaded web content from the associated web service. The graphic store can also be accessed indirectly by users through other web services.

Note that the association between a web service and a graphics store is particularly advantageous where a user needs temporary or permanent storage in order to operate on/process graphics from one web service at another web service. For example, a user might access with his/her browser a first web service (a web cam, for example) and use the web content therefrom to create a web cam image graphic within a graphics store associated with that first web service and to also create a composition therefor in a default composition store in the user's personal imaging repository, and add a reference to the newly created composition (typically a URL) of the web cam graphic in the graphic store. The user can then browse to a second web service (for example, a printer to print the web cam image). The web content from the second web service can then access the web cam image graphic through the reference in the newly created composition and perform its printing function with that web cam image data, One of the advantages to this sequence is that the user does not have to provide storage for the web cam graphic.

It should be noted that in a further aspect of the present invention, some web services, both inside and outside the firewall, may find it to be commercially important to have graphic stores associated therewith that have long term stability, so that there is no need to create a new graphic for them in another graphics store. As noted above, the graphic store associated with the web service could be made part of the personal imaging repository by referencing it via a URL, pointer or other convenient reference. (A graphic store is effectively made to be part of a user's personal imaging repository by referencing a graphic within that graphic store from the user's personal imaging repository. It's actually more accurate to think of graphics, compositions, and user profiles as being part of the user's personal imaging repository rather than thinking of the individual services. In fact, it's possible to have only part of the graphics available through a graphic store referenced by the user's personal imaging repository.) An example of such an associated graphics store might be a server repository for archival storage of news articles, with the graphics store functionality described herein. A reference in a composition could reference this graphic within the graphics store in the archival storage service.

As noted earlier, a special aspect of the present invention is the ability in the graphics store to create graphics "on the fly." This aspect is facilitated by the association of the web service and a graphics store and a resource, as in the configuration shown in FIG. 11. A reference can be provided in a composition to a resource that doesn't really exist in the graphics store, if there is the ability to simulate the existence of that resource. For example, assume that a web service that has a graphics store associated therewith adds to the user's personal imaging repository (through web content acting on its behalf) a URL reference to a famous document in the associated graphics store as follows: "http://famousdocs.com?doc=declarationofindependence". A user might subsequently ask, via the web content (presumably from another web service or the same web service) in his browser, for a bitmap (e.g., jpeg) image of the first page of the document referenced by this URL. The graphics store, which would be accessed (indirectly through the imaging extension) by the web content via this reference, might not have the actual JPEG image of the first page, but only a text file of the famous document in question. But the graphics store might include various services including a text-to-bitmap conversion service. From this text file, the graphics store would generate with this conversion service a bitmap of the first page and return the requested bitmap to the user at his/her browser.

In a second example, a user might browse to a webmail service and get a URL like "http://graphicstore.webmail.com?imap=imap1.webmail.com&user=john smith&messageid=23456" corresponding to an email message of the user. Later, the user might request, via the web content in his browser indirectly contacting the graphics store, for the first page of this email message formatted to be printed in the form of a jpeg image. In this case, the email message is actually stored in another network service like an "IMAP service," which is responsible for storing and providing access to email messages. In response to the user's request, since the graphics store does not actually have what the user is asking for, the graphics store would contact the IMAP service using the information embedded within the reference, obtain the user's email message, format the email message for printing using a service that also may be available at the graphics store, and then using a different service at the graphics store to generate a bitmap of the first page. (The services mentioned in the previous sentence might be replaced with simple code libraries that would be used by the graphic store service. In fact, in the preferred implementation, this would be done.)

Note that the graphic store does not need to be on the same machine as the web server for the web service. It may be located on another machine. The key point is that web content coming from the web service associated with the graphic store "knows" about the graphic store and uses the graphic store by generating an appropriate URL (or more generally a reference) that refers back to the graphic store. As discussed here, the graphics store doesn't even need to have the resource in question—just the ability to respond to requests regarding that resource. This is important because it reduces the need for storage at the graphics store, ensures that information is up-to-date (because multiple copies introduce the possibility that one copy will become out-of-date), and allows some operations to be completed more quickly. For example, if a graphics store is asked by web content whether or not a particular graphic (in this case a virtual graphic) contains any color, the composition store may be able to respond very quickly to that question based on knowledge about the underlying information (for example an email message).

It should be understood that there is a distinction between a graphic store interface and a graphic store implementation. The graphic store interface is the set of methods that all graphic store services must implement in order to be a graphic store. The graphic store implementation is how these interfaces are implemented. The implementation may vary widely from graphic store to graphic store.

The term "associated" in the context of a web service and a graphics store may take a number of variations. In the example in the paragraph above with the graphics store associated with a web service, the graphic store would preferably be implemented in such a way so as to know about the way the web applications in the associated web service store data internally. Every web application in a web service has its own internal data representation that is used during the operation of the application. A properly implemented graphic store that is tightly integrated with an application on a web service would have access to and could use this internal data representation to optimize its behavior (since the graphic store and web server could be implemented as part of a larger web service and could share the internal data representation). For example, an application providing graphics used to produce a booklet might have information in its internal data about the number of pages available. This page count information could be accessed directly by the graphics store without generating print ready data, if the application is tightly integrated with that graphics store. Providing timely information about the number of pages would enhance the operation of the booklet making web service, since this information is required to format the booklet correctly.

A variety of different stores and other configurations including the imaging extension have been described, each with their own APIs. A set of example APIs are set forth below for a number of the stores and the imaging extension disclosed herein. Note that the example API sets are not complete sets, but are set forth to provide a representative idea of the typical APIs that would be present. Notably missing from the API sets are error handling and position information methods. The API sets below are not intended to be limiting in any sense, and are intended as examples only. The API sets are expressed using C/C++/Java/Perl style syntax (loosely). Also note that these are ad hoc APIs that would not mesh with certain broader aspects of web-based imaging provided in this patent application, and are provided as one example only.

The API is written using conventional notation. This notation is described in most introductory texts for most programming languages. However, this notation is example notation and no limitation thereto is intended. The general form of a method that makes up an API is:

```
returnType MethodName ( ParameterType1 parameterName1, ParameterType2 parameterName2, . . . );
```

Where, returnType is the type returned by the method. Typically, the meaning of the value returned is obvious from the name of the method. For example, the method "string GetPresidentsAddress( )" returns a value of type "string", which from the name of the method can be determined to contain the President's address.

MethodName is the name of the method. This name should be a concise description of the purpose of the method.

ParameterTypeN is the type for parameter N, where N is the nth parameter in the argument list of the method. Parameter types indicate the data format of the parameter that is passed to the method, such as string, integer, or more complex structures/objects. Parameter types may or may not be descriptive of the meaning of the parameter. If they are not, it is necessary to include a parameter name to ensure that the reader understands the meaning of the parameter.

parameterNameN is the name for parameter N, where N is the nth parameter in the argument list of the method. Parameter names should indicate the meaning of the parameter. Sometimes they are redundant and can be optionally omitted. For example, a parameter described as "Session session" with a parameter type of Session and a parameter name of session is needlessly redundant. In these cases, it is typical to omit the parameter in describing the method of the API.

It should be noted that a parameter named "OpaqueRef preferredDestination" is compatible with return values of type OpaqueRef. The name "preferredDestination" is merely the descriptive name of the parameter and does not determine parameter compatibility. Return values do not typically have names, since the meaning of the return value is implied by the method name. Any notes are identified by //.

1. Programming Interfaces (APIs)

a.   Network Service APIs

[0113]   i.   User Profile Store Service API

```
UserProfileStoreSession OpenSession( UserIdentification, Credentials );
CloseSession( UserProfileStoreSession );
URL GetReferenceToDefaultGraphicStore( UserProfileStoreSession );
URL GetReferenceToDefaultCompositionStore( UserProfileStoreSession );
URL GetReferenceToDefaultComposition( UserProfileStoreSession );
URL[] GetReferencesToAvailableCompositionStores( UserProfileStoreSession );
URL[] GetReferencesToCandidateDefaultGraphicStores( UserProfileStoreSession );
URL[] GetReferencesToCandidateDefaultCompositionStores( UserProfileStoreSession );
URL[] GetReferencesToCandidateDefaultCompositions( UserProfileStoreSession );
URL[] GetReferencesToGroupCompositionStores( UserProfileStoreSession );
AddReferenceToCandidateDefaultGraphicStore( UserProfileStoreSession, URL
candidateDefaultGraphicStoreReference );

AddReferenceToCandidateDefaultCompositionStore( UserProfileStoreSession, URL
    candidateDefaultCompositionStoreReference );

AddReferenceToCandidateDefaultComposition( UserProfileStoreSession, URL
    candidateDefaultCompositonReference );

PrioritizeReferencesToCandidateDefaultGraphicStore( UserProfileStoreSession, URL
    candidateDefaultGraphicStoreReferences[] );

PrioritizeReferencesToCandidateDefaultCompositionStore( UserProfileStoreSession, URL
    candidateDefaultCompositionStoreReferences[] );
```

-37-

```
PrioritizeReferencesToCandidateDefaultComposition( UserProfileStoreSession,
    URLcandidateDefaultCompositionReferences[] );

AddReferenceToGroupCompositionStore( UserProfileStoreSession, URL
    groupCompositionStore );
RemoveReferenceToGroupCompositionStore( UserProfileStoreSession, URL
    groupCompositionStore );

URL GetReferenceToPreferredPrinterListDestination( UserProfileStoreSession );
URL GetReferenceToPreferredPrinterDestination( UserProfileStoreSession );
URL GetReferenceToPreferredPrintNowDestination( UserProfileStoreSession );
URL GetReferenceToPreferredImagingHomeDestination( UserProfileStoreSession );

SetReferenceToPreferredPrinterListDestination( UserProfileStoreSession, URL
    preferredPrinterListDestination );
SetReferenceToPreferredPrinterDestination( UserProfileStoreSession, URL
    preferredPrinterDestination );
SetReferenceToPreferredPrintNowDestination( UserProfileStoreSession, URL
    preferredPrintNowDesination );
SetReferenceToPreferredImagingHomeDestination( UserProfileStoreSession, URL
    preferredImagingHomeDestination );

PrintActionCriteria GetPrintActionCriteria( UserProfileStoreSession );
SetPrintActionCriteria( UserProfileStoreSession, PrintActionCriteria );
```

[0114] ii. Composition Store Service API

```
CompositionStoreSession OpenSession( UserIdentification, Credentials);
CloseSession( CompositionStoreSession );
URL CreateComposition( CompositionStoreSession );
DeleteComposition( CompositionStoreSession, URL composition );
URL[] GetCompositions( CompositionStoreSession );
URL[] GetElementsInComposition( CompositionStoreSession, URL composition );
URL GetGraphicCorrespondingToElementInComposition( CompositionStoreSession, URL
    composition, URL element );
PositionInformation GetPositionInformationCorrespondingToElementInComposition(
    CompositionStoreSession, URL composition, URL element );
URL AddElementToComposition( CompositionStoreSession, URL composition, URL graphic,
    PositionInformation );
RemoveElementFromComposition( CompositionStoreSession, URL composition, URL element);
CompositionInfo GetCompositionInfo( CompositionStoreSession, URL composition ); //
    number of pages, color, etc.
GraphicFormat[] GetGraphicFormatsInWhichEntireCompositionIsAvailable(
    CompositionStoreSession, URL composition );
GraphicFormat[]
    GetGraphicFormatsInWhichEntireCompositionIsAvailableInGivenCanvasOrder(
    CompositionStoreSession, URL composition, CanvasOrder );
GraphicFormat[] GetGraphicFormatsInWhichAGivenCanvasIsAvailable(
    CompositionStoreSession, URL composition, int canvasNumber );
GraphicData GetGraphicDataForEntireComposition( CompositionStoreSession, URL
    composition, GraphicFormat );
GraphicData GetGraphicDataForEntireCompositionInGivenCanvasOrder(
    CompositionStoreSession, URL composition, CanvasOrder, GraphicFormat );
GraphicData GetGraphicDataForAGivenCanvas( CompositionStoreSession, URL composition,
    int canvasNumber, GraphicFormat );
```

[0115] iii. Graphic Store Service API

```
GraphicStoreSession OpenSession( UserIdentification, Credentials );
CloseSession( GraphicStoreSession );
```
// NOTE: Each page is a distinct graphic (this is a design decision made in creating these APIs)
```
URL CreateGraphic( GraphicStoreSession, GraphicFormat, GraphicData ); // creates at
most one graphic from the graphic data
URL[] CreateGraphics( GraphicStoreSession, GraphicFormat, GraphicData ); // creates
one or more graphics from the graphic data
```

Atty. Dkt. No.: 10015146-1

```
DeleteGraphic( GraphicStoreSession, URL graphic );
```

// NOTE: Fig. 6 describes a process where a graphic is created, opened, written to, and closed. For purposes of the present API example, the process has been simplified. However, for consistency, the following five methods that track the methods described in the flow chart are included. These methods would create a single graphic, which based on the design decision used in this example, would result in a single "page" (or canvas).

```
// URL CreateGraphic( GraphicStoreSession, GraphicFormat );
// Graphic OpenGraphic( GraphicStoreSession, URL graphic );
// WriteGraphic( GraphicStoreSession, Graphic, Data );
// Data ReadGraphic( GraphicStoreSession, Graphic );
// CloseGraphic( GraphicStoreSession, Graphic );
GraphicInfo GetGraphicInfo( GraphicStoreSession, URL graphic );  // color, etc.
GraphicFormat[] GetGraphicFormatsInWhichGraphicIsAvailable( GraphicStoreSession,
       URL graphic );
GraphicData GetGraphicDataForGraphic( GraphicStoreSession, URL graphic,
       GraphicFormat );
```

[0116]  b. Imaging Extension API

```
Session CreateSession( Credentials );  // User identification is obtained automatically
CloseSession( Session );

BrowseToPreferredDestination( Session, OpaqueRef preferredDestination );  //
       modified
```

// Note: Regarding BrowseToPreferredDestination, this method enables the browser to be directed to browse to a preferred destination without exposing the underlying URL to the user.

```
OpaqueRef CreateOpaqueRefFromURL( Session, URL );
```

// Note: Regarding CreateOpaqueRefFromURL, some websites aren't allowed to use this method at all, some websites are only allowed to convert their own URL's to OpaqueRef's (to prevent arbitrary access to network services), still others are allowed full access to this method. (Access is based on credentials.)

```
URL GetURLFromOpaqueRef( Session, OpaqueRef );
```

// Note: Regarding GetURLFromOpaqueRef, access to this method is limited. (Access is based on credentials. Access to any of these methods may be limited based on credentials.)

```
Composition[] GetAvailableCompositions( Session );

OpaqueRef GetReferenceToDefaultGraphicStore( Session );
OpaqueRef GetReferenceToDefaultCompositionStore( Session );
OpaqueRef GetReferenceToDefaultComposition( StoreSession );
OpaqueRef[] GetReferencesToAvailableCompositionStores( Session );
OpaqueRef[] GetReferencesToCandidateDefaultGraphicStores( Session );
OpaqueRef[] GetReferencesToCandidateDefaultCompositionStores( Session );
OpaqueRef[] GetReferencesToCandidateDefaultCompositions( Session );
OpaqueRef[] GetReferencesToGroupCompositionStores( Session );
AddReferenceToCandidateDefaultGraphicStore( Session, OpaqueRef
       candidateDefaultGraphicStoreReference );
AddReferenceToCandidateDefaultCompositionStore( Session, OpaqueRef
       candidateDefaultCompositionStoreReference );
```

-39-

```
AddReferenceToCandidateDefaultComposition( Session, OpaqueRef
      candidateDefaultCompositonReference );
PrioritizeReferencesToCandidateDefaultGraphicStore( Session, OpaqueRef
      candidateDefaultGraphicStoreReferences[] );
PrioritizeReferencesToCandidateDefaultCompositionStore( Session, OpaqueRef
      candidateDefaultCompositionStoreReferences[] );
PrioritizeReferencesToCandidateDefaultComposition( Session, OpaqueRef
      candidateDefaultCompositionReferences[] );
AddReferenceToGroupCompositionStore( Session, OpaqueRef groupCompositionStore );
RemoveReferenceToGroupCompositionStore( Session, OpaqueRef groupCompositionStore );

OpaqueRef GetReferenceToPreferredPrinterListDestination( Session );
OpaqueRef GetReferenceToPreferredPrinterDestination( Session );
OpaqueRef GetReferenceToPreferredPrintNowDestination( Session );
OpaqueRef GetReferenceToPreferredImagingHomeDestination( Session );
SetReferenceToPreferredPrinterListDestination( Session,
      OpaqueRef preferredPrinterListDestination );
SetReferenceToPreferredPrinterDestination( Session, OpaqueRef
      preferredPrinterDestination );
SetReferenceToPreferredPrintNowDestination( Session, OpaqueRef
      preferredPrintNowDesination );
SetReferenceToPreferredImagingHomeDestination( Session, OpaqueRef
      preferredImagingHomeDestination );
PrintActionCriteria GetPrintActionCriteria( Session );
SetPrintActionCriteria( Session, PrintActionCriteria );
PrintActionContext CreatePrintActionContext( Session, ContextElement[] );
OpaqueRef GetDestinationUsingPrintActionCriteriaAndContext(
      Session, PrintActionCriteria, PrintActionContext );

OpaqueRef[] GetCompositions( Session );
OpaqueRef[] GetElementsInComposition( Session, OpaqueRef composition );
OpaqueRef GetGraphicCorrespondingToElementInComposition( Session, OpaqueRef
      composition, OpaqueRef element );
PositionInformation GetPositionInformationCorrespondingToElementInComposition(
      Session, OpaqueRef composition, OpaqueRef element );
OpaqueRef AddElementToComposition( Session, OpaqueRef composition, OpaqueRef graphic,
      PositionInformation );
RemoveElementFromComposition( Session, OpaqueRef composition, OpaqueRef element);
CompositionInfo GetCompositionInfo( Session, OpaqueRef composition );  // number of
      pages, color, etc.
GraphicFormat[] GetGraphicFormatsInWhichEntireCompositionIsAvailable( Session,
      OpaqueRef composition );
GraphicFormat[]
      GetGraphicFormatsInWhichEntireCompositionIsAvailableInGivenCanvasOrder(
      Session, OpaqueRef composition, CanvasOrder );
GraphicFormat[] GetGraphicFormatsInWhichAGivenCanvasIsAvailable( Session, OpaqueRef
      composition, int canvasNumber );
GraphicData GetGraphicDataForEntireComposition( Session, OpaqueRef composition,
      GraphicFormat );
GraphicData GetGraphicDataForEntireCompositionInGivenCanvasOrder( Session, OpaqueRef
      composition, CanvasOrder, GraphicFormat );
GraphicData GetGraphicDataForAGivenCanvas( Session, OpaqueRef composition, int
      canvasNumber, GraphicFormat );
```

// NOTE: Each page is a distinct graphic (this is a design decision made in creating these APIs)
```
OpaqueRef CreateGraphic( Session, GraphicFormat, GraphicData );
```
// creates at most one graphic from the graphic data
```
OpaqueRef[] CreateGraphics( Session, GraphicFormat, GraphicData );
```
// creates one or more graphics from the graphic data
```
DeleteGraphic( Session, OpaqueRef graphic );
```

// NOTE: Fig. 6 describes a process where a graphic is created, opened, written to, and closed. For purposes of the present API example, the process has been simplified. However, for consistency, the following five methods that track the methods described in the flow chart are included. These methods would create a single graphic, which based on the design decision used in this example, would result in a single "page" (or canvas).

```
// OpaqueRef CreateGraphic( Session, GraphicFormat );
// Graphic OpenGraphic( Session, OpaqueRef graphic );
// WriteGraphic( Session, Graphic, Data );
// Data ReadGraphic( Session, Graphic );
// CloseGraphic( Session, Graphic );
GraphicInfo GetGraphicInfo( Session, OpaqueRef graphic); // color, etc.
GraphicFormat[] GetGraphicFormatsInWhichGraphicIsAvailable( Session,
      OpaqueRef graphic );
GraphicData GetGraphicDataForGraphic( Session, OpaqueRef graphic, GraphicFormat );
```

2. Pseudo Code Examples of Using APIs

[0117]  a. Web Content Redirecting Browser to a Web Imaging Home

// Note: The following method is called as a result of the end-user clicking on a link (or button) to the Web Imaging Home page. This method is part of the web content that gets downloaded into the user's browser. The "=" notation means assigning a value to a variable, i.e., in the method below, the variable "session" is assigned the value of the session created by the method "CreateSession." The "->" operator (used below in examples) is standard notation for invoking a method in an object. For simplicity, services are represented as objects. In a typical implementation, since the actual service operates on a remote machine it would be represented as a "proxy" object. A "proxy" object provides a local calling interface to the client code and handles the communication required with the actual service (effectively hiding the communication process from the client code).

```
RedirectBrowserToWebImagingHomePage( Credentials webServiceCredentials )
{
        Session session = CreateSession( webServiceCredentatials );
        OpaqueRef preferredImagingHomeDestination =
GetReferenceToPreferredImagingHomeDestination( session );
        BrowseToPreferredDestination( session, preferredImagingHomeDestination );
        CloseSession( session );
}
``` b.   Implementation of Selected Methods of Imaging Extension API

[0118]  i.  GetReferenceToPreferredImagingHomeDestination

```
OpaqueRef GetReferenceToPreferredImagingHomeDestination( Session session );
{
```

// Note: This is a private method, i.e., not exposed as part of the imaging extension API, which returns the user identity UserIdentification by opening the method GetUserIdentification with the argument "session" obtained in the previous method relating to redirecting the browser.

```
        UserIdentification userIdentification = GetUserIdentification( session );
```

Atty. Dkt. No.: 10015146-1

// Note: The following pseudo code obtains a reference to the user profile store using a private method, which obtains the identity of the user profile store "UserProfileStore" from the user identity
```
UserProfileStore userProfileStore = GetUserProfileStore( session );
```

// Note: The following psuedo code calls an "OpenSession" method on the user profile store service to "log into" the user profile store using the arguments "UserIdentification" and "Credentials" obtained earlier, and returns "UserProfileStoreSession." As noted above, the arrow sign "->" in this notation means calling/invoking a method of an object, where the object is on the left side and the method inside the object on the right side--object->method(parameter) using the arguments set forth. In this example, the method "OpenSession" is called within the object "UserProfileStore."
```
UserProfileStoreSession userProfileStoreSession = UserProfileStore ->
OpenSession( UserIdentification, Credentials );
```

// Note: The following pseudo code calls/invokes a method "GetReferenceToPreferredImagingHomeDestinationURL" provided by the UserProfileStore object or service that returns an imaging home destination preferred by the user (in this example a URL).
```
URL preferredImagingHomeDestinationURL = userProfileStore-
>GetReferenceToPreferredImagingHomeDestination( UserProfileStoreSession );
```

// Note: The following pseudo code creates and returns an opaque reference "OpaqueRef" corresponding to the URL using a private imaging extension method with the arguments "session" and "preferredImagingHomeDestinationURL.".
```
OpaqueRef preferredImagingHomeDestination = CreateOpaqueReferenceFromURL(
session, preferredImagingHomeDestinationURL );
```

// Note: The following pseudo code ends communication with the user profile store.
```
CloseSession( UserProfileStoreSession );
```

// Note: The following pseudo code returns the opaque reference.
```
return preferredImagingHomeDestination.
}
```

[0119] ii. BrowseToPreferredDestination

```
OpaqueRef BrowseToPreferredDestination( Session session, OpaqueRef destination );
{
```
// The following pseudo code is a private method, not exposed as part of the imaging extension API, which converts an opaque reference to a URL.
```
URL destinationURL = GetURLFromOpaqueReference( session, destination );
```

// The following is a method that redirects the browser to a destination given a URL
```
RedirectBrowser( destinationURL );
```

The foregoing includes a plurality of innovative APIs. Note in the various APIs the Set methods for setting a preferred printer list destination (PreferredPrinterDestinationList, i.e., a list of printers that will be displayed or otherwise offered for selection), a preferred printer destination (PreferredPrinterDestination, i.e., a single preferred printer that will be selected and a printer settings page displayed or otherwise offered for selection), and a preferred print now destination (PreferredPrintNowDestination, i.e., a printer selected for use with preset settings—no opportunity to set the print settings) in the User's Profile in the User Profile Store, as well as a method for selecting a preferred print destination based on criteria (PrintActionCriteria) and a context (PrintActionContext). These methods use the arguments "userProfileStoreSession" and "uRL-preferred . . ." or "printActionCriteria." Typically, the reference will be a URL, but may also be some other convenient reference, such as a proprietary encoding scheme for identifying (and thus referencing) the resource in question.

Likewise, note the various Get methods "GetReference . . ." or "GetPrintActionCriteria" for getting one of the references set by the setting method for the preferred printer list destination, the preferred printer destination, the preferred printnow destination, and the PrintActionCriteria in the User's Profile in the User Profile Store. These methods use the argument "UserProfileStoreSession" and return a "URL, or the "PrintActionCriteria."

The GetDestinationPrintActionCriteriaAndContext is of particular interest. This method is used to Get the user's preferred print action in a particular situation (context), based on criteria, i.e., prescribed rules. This method would redirect the browser to the preferred printer list, PreferredPrinterListDestination, (so he or she can choose from a number of available printers), or redirect the browser to the preferred printer PreferredPrinterDestination (so he or she can choose options relating to that printer), or redirect the browser to the preferred print now destination PreferredPrintNowDestination (so printing will begin immediately), or some other printer that is preferred in a particular context. Although each of these three or more destinations can be designated specifically, i.e., the application explicitly provides a mechanism for the user to choose "PrinterList," or "Printer," or "PrintNow," other applications might simply provide a mechanism for the user to generically choose "print," without specifying which of the "PrinterList," "Printer," "PrintNow," or other destination that the user's browser should be directed to. Alternatively, the web content could provide a web page that contains both a "print" button and a "PrintNow" button. The generic "print" button would use the PrintActionCriteria and PrintActionContext and GetPrintActionDestinationUsingCriteriaAndContext (or whatever the function is called) discussed below to determine the actual URL the user's browser would be redirected to. The "PrintNow" button would simply use the "PrintNow" destination as obtained using the function "GetPrintNowDestination" (or whatever the function is called).

The purpose of GetDestinationUsingPrintActionCriteriaAndContext is to help determine which of the available print actions should be undertaken and returns a reference to the preferred destination to which the browser should be redirected. This method takes as parameters Session, and type PrintActionContext and type PrintActionCriteria. PrintActionContext provides information that might be useful in determining the destination using the GetDestinationUsingPrintActionCriteriaAndContext method. Such context information might be the URL of the current website, the type of the current website (for example, as determined by a tag in the current website), where the user is located, whether the user is inside or outside of a firewall, and various other information. The PrintActionCriteria may be a set of rules, conditional logic or other criteria to use/interpret the context information to determine the preferred destination. By way of example but not by way of limitation, a set of rules/conditional logic might be:

If website is—Amazon.com, then destination is PreferredPrintNowDestination;

If website is—a productivity website (based on a tag in the web content for the website, for example), then the destination is PreferredPrinterDestination;

If user location is—outside of office, then the destination is PrinterA;

If user location is—in office, then the destination is Preferred PrinterListDestination;

If the firewall status is—outside of office, then use PrinterB.

The method GetDestinationUsingPrintActionCriteriaAndContext would interpret the forgoing rules in the data structure of the PrintActionCriteria based on the information from the PrintActionContext to determine the destination.

Note in the imaging extension example API the methods for browsing to a preferred print destination using an opaque reference. The methods include "CreateOpaqueRefFromURL, which uses the "URL" as an argument and returns "OpaqueRef;" and the method "BrowseToPreferredDestination" which uses the arguments "Session, OpaqueRef preferredDestination" to cause the browser to browse to the URL reference without exposing the URL to the Web content.

Referring to the example API for the imaging extension, note the comparable method set for getting an opaque reference "OpaqueRef" for the printer list destination, the preferred printer destination, the print now destination, and the preferred imaging home page destination using the appropriate GetReference methods. Likewise, note the set of methods for setting the reference to the preferred destination, i.e., the PreferredPrintListerDestination, PreferredPrinterDestination, PreferredPrintNowDestination, and the Preferred ImagingHomePageDestination, using the appropriate "SetReferenceTo . . . " method with the arguments of type "Session, OpaqueRef."

Likewise, note the method for setting print action criteria for determining an automatic print destination, i.e., "SetPrintActionCriteria" which uses the arguments "UserProfileStoreSession" and "PrintActionCriteria." Also included is a Get method "Sessions, PrintActionDestinationPreference." The SetPrintActionDestinationPreference is the default destination which is used if no PreferredPrinterList, or PreferredPrinter or PreferredPrintNow or PreferredImagingHomePage has been selected at the browser. Also included is a Get method for getting an opaque reference "OpaqueRef" for the PrintActionDestinationPreference set in the setting reference using the arguments "Sessions, PrintActionDestinationPreference." Also included is a Get method "Get PrintActionDestinationPreference" using the argument "Session" to get the PrintActionDestinationPreference.

Figure 2:
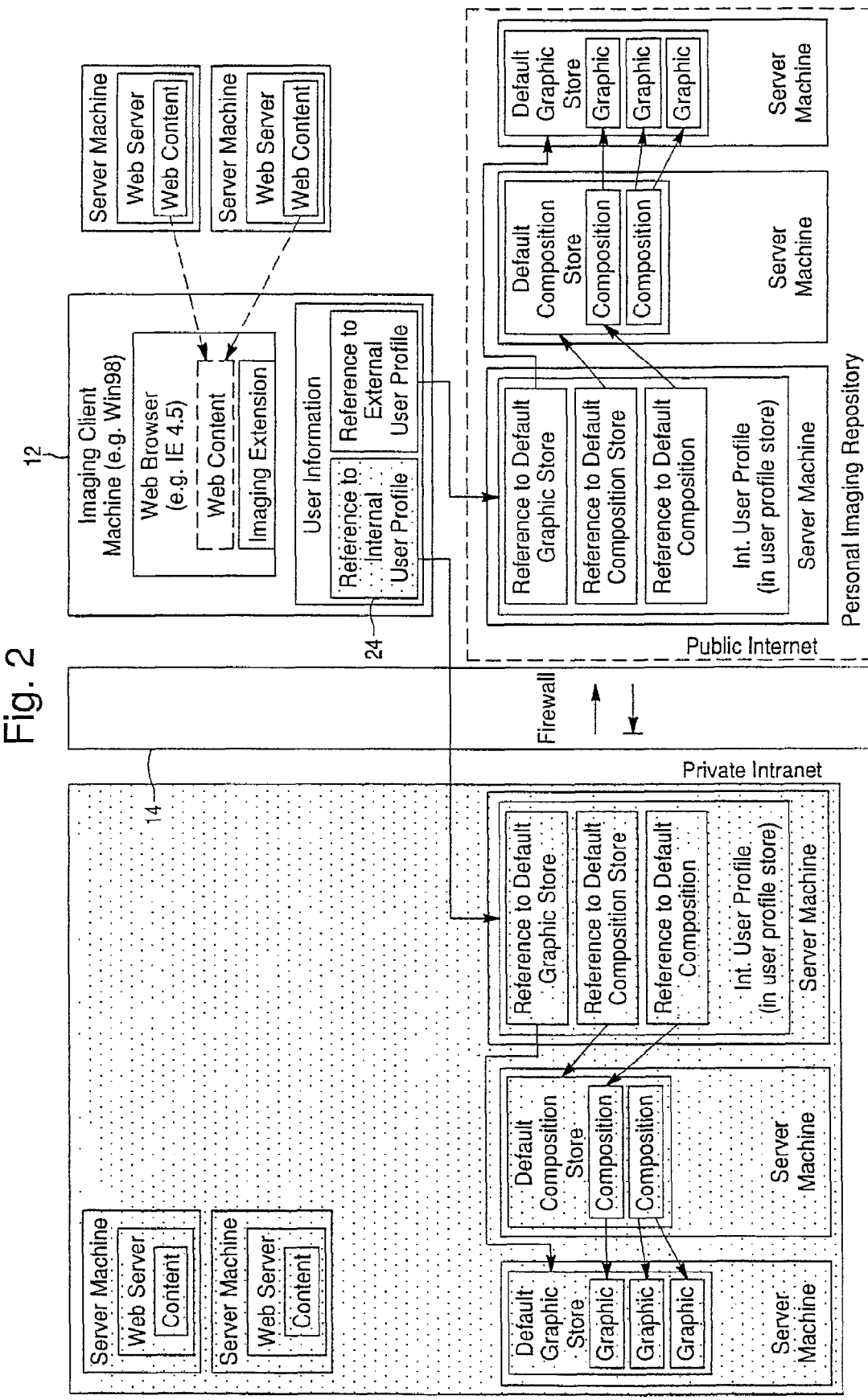
FIG. 2 is an architectural diagram of the client-server network system of FIG. 1 with the imaging client shown outside of a firewall.

Referring now to FIG. 2, there is shown the same configuration as FIG. 1, but with the imaging client 12 outside of the firewall 14. In this situation, none of the servers inside of the firewall 14, including the composition stores and the graphic stores, would be accessible. This is illustrated by graying out the servers inside the firewall and also graying out the reference to the internal user profile.

Figure 3:
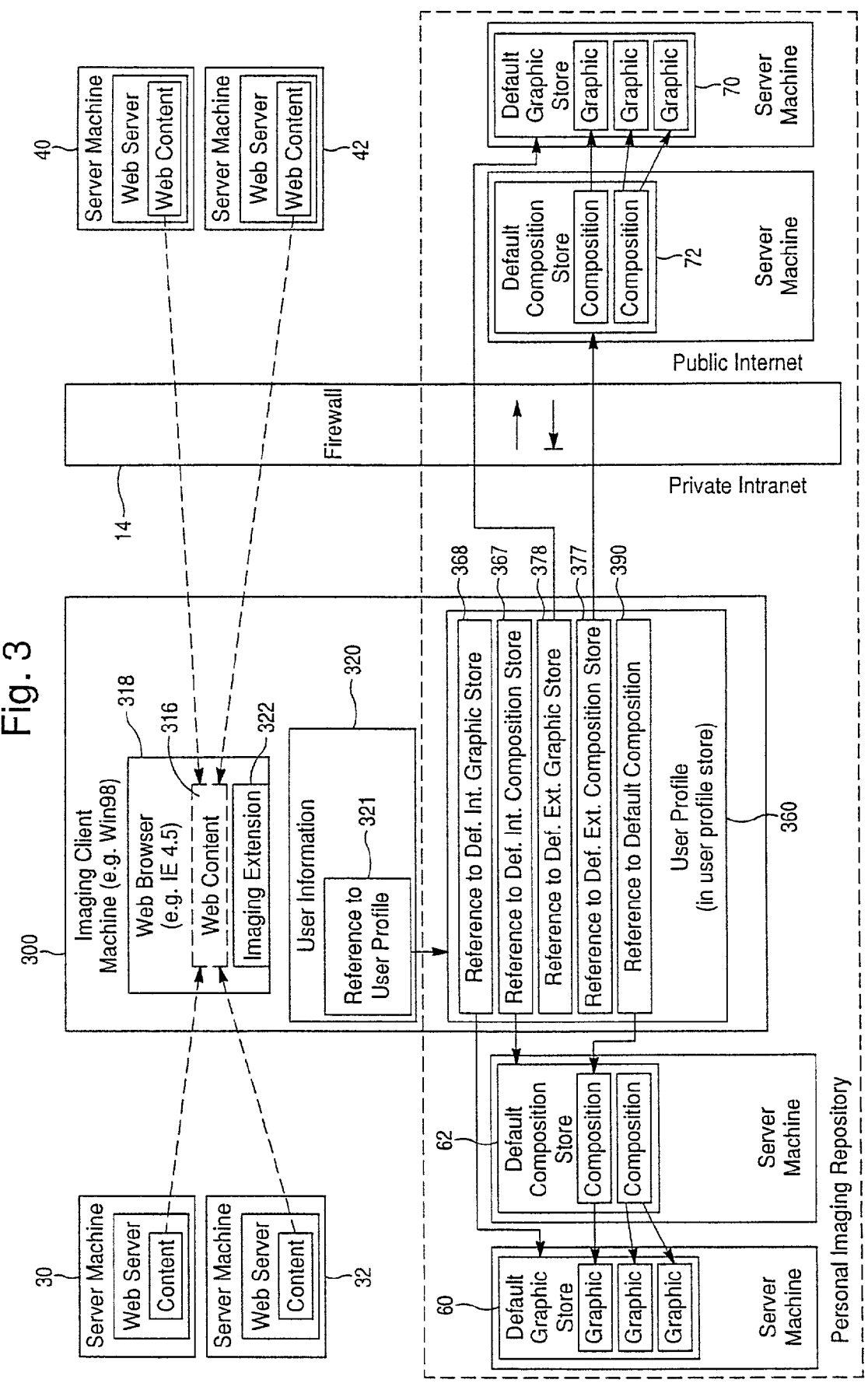
FIG. 3 is an architectural diagram of a second client-server network system in which the present invention can be implemented.

Referring now to FIG. 3, a different configuration of the present invention is provided. Like-numbered blocks take the same meaning as in FIGS. 1 and 2. In this configuration, the imaging client 300 includes a web browser 318 that has downloaded web content 316, an imaging extension 322, and a user information block 320, which operate substantially as described previously. However, in this configuration, the imaging client 300 includes thereon the user profile 360. The user profile 360 is designed for both internal (inside the firewall) operation, and external (outside the firewall) operation. Accordingly, this user profile 360 includes a user identification (not shown), as well as a reference 367 to a default internal composition store 62, a reference 368 to a default internal graphics store 60, a reference 377 to a default external composition store 72, a reference 378 to a default external graphics store 70, and may include a reference 390 to a default composition.

Additionally, in the imaging client there is code for invoking a method to access the references stored in the user profile 360. Typically, this invoked method would also include code to select the appropriate references based on a criteria. By way of example, this code could provide a user interface to allow the user to select manually the default composition store and the default graphics store. Alternatively or in addition, the code could automatically select a default composition store and a default graphics store based on a criteria, such as for example but not by way of limitation, the type or identification of the imaging client machine being used by the user, or whether the imaging client has connected to a network inside the firewall 14 or is otherwise inside the firewall or whether it is outside the firewall.

Note that the imaging client 300 is shown in FIG. 3 inside of the firewall 14. Accordingly, the browser 318 in the imaging client has access to the web servers 30 and 32 inside of the firewall, as well as the servers 40 and 42 outside of the firewall. Also, the user has the option to select a default composition store and a default graphics store either inside or outside of the firewall.

Figure 4:
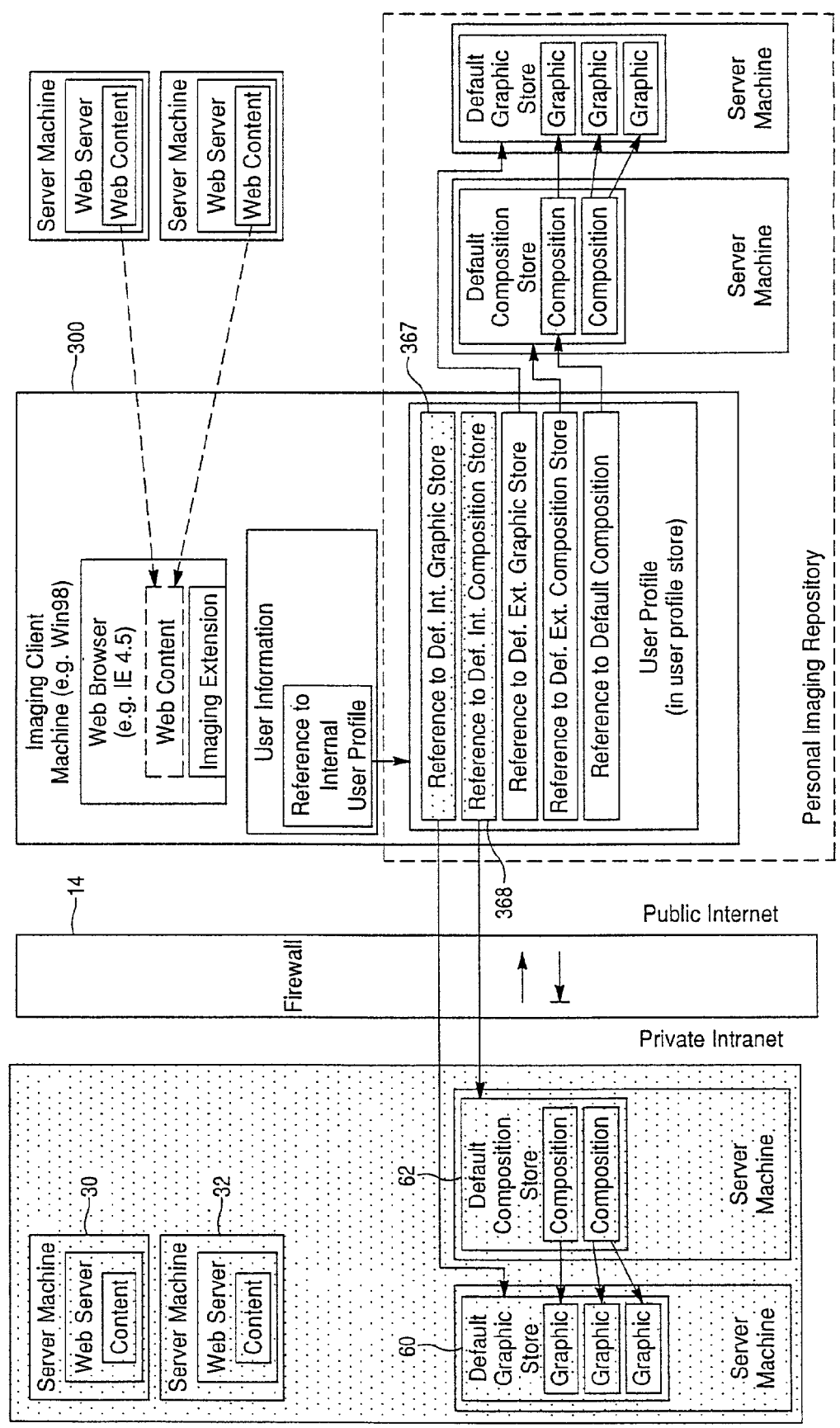
FIG. 4 is an architectural diagram of the client-server network system of FIG. 3 with the imaging client shown outside of a firewall.

FIG. 4 shows the same configuration as in FIG. 3, except that the imaging client 300 is outside of the firewall 14. Thus, the imaging client does not have access to the web servers 30 and 32 and the composition store 62 and the graphics store 60 inside of the firewall 14. This lack of access in this case is illustrated by graying out the servers 30, 32, 60, and 62, as well as the references 367 and 368 to the default internal composition store and the default internal graphics store.

Figure 5:
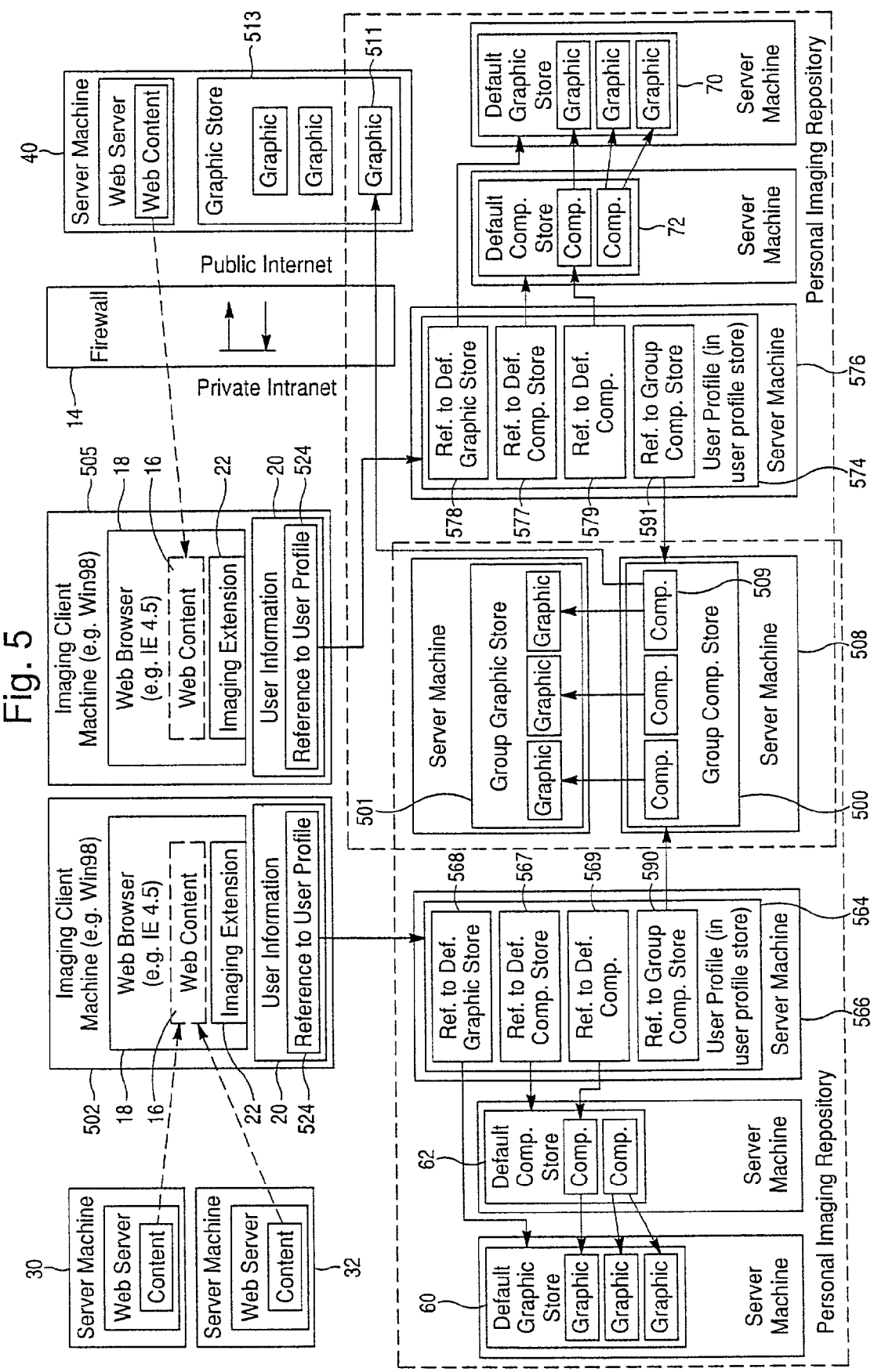
FIG. 5 is an architectural diagram of the client-server network using a shared or group composition store and graphics store.

GROUP COMPOSITION STORE Referring now to FIG. 5, there is shown a configuration of the present invention wherein there is at least one composition store 500 and one graphics store 501 that is shared by a plurality of imaging clients 502 and 505. Like numbered references have the same meaning as per FIG. 1. Note that each imaging client 502 and 505 includes a web browser 18 that has downloaded web content 16, as well as an imaging extension 22, and a user identification 20. In the example shown for illustration of the concepts, the web content 16 for the imaging client 502 includes web content from either of the web servers 30 or 32 that are inside of the firewall, while the web content 16 for the imaging client 505 includes web content from a web server 40 outside of the firewall. (Note that this diagram is for ease of illustration only. Both imaging clients 502 and 505, because they are inside of the firewall 14, have access to all of the web servers, inside of and outside of the firewall 14, and may download web content therefrom.) The user identification 20 in or loaded into the imaging client 502, includes a reference to a server 566 that contains the user profile 564 of interest. Likewise, the user information 20 in or loaded into the imaging client 505 includes a reference 524 to a user profile 574 on the server 576.

It should be noted that a given "imaging client" might just be a public machine at an airport. This public machine might be used by inserting a "smart card" into the public machine. The smart card would contain the "user information 20". Accordingly, the user profile is generally associated with the user—not the imaging client machine, per se. Note that there might be many distinct "user identification 20's" that all reference the same user profile (or set of user profiles). For example, there might be one "user identification 20" in the user's laptop and another in the user's mobile phone—both of which refer to the same user profile.)

Referring again to FIG. 4, the user profile 564 includes a reference 567 to a default composition store 62, a reference 568 to a default graphics store 60, a reference 569 to a default composition, and a reference 590 to the group composition store 500.

Likewise, the user profile 574 includes a reference 577 to a default composition store 72, a reference 578 to a default graphics store 70, a reference 579 to a default composition, and a reference 591 to the group composition store 500.

It can be seen that the group composition store 500 and the group graphics store 501 are disposed on the same server 508, for ease of illustration. However, they may be on different servers. The group composition store 500 includes a plurality of compositions that each references a graphic in the group graphics store for ease of illustration. There is no requirement that a composition in the group composition store reference a graphic in the group graphics store. It could reference a graphic anywhere. Additionally, one composition 509 references a graphic 511 in a graphics store 513 in a server 40 outside of the firewall 14.

Note that when the web content uses the imaging extension to obtain and then display to the user a list of all available compositions (for use with the web content currently operating in the imaging client 12), all accessible compositions in the various composition stores, including the group composition store(s) will be on the list. A dialogue is then commenced with the user to select the desired composition, which selection may include a composition in the group composition store.

There can be several group composition stores available for different groups. For each group composition store that the user accesses, there will be a reference to that group composition store in one of that user's profiles. Note that a reference to a particular group composition store is typically added to the user's profile by the user "subscribing" to the group composition store. This might be accomplished by the user browsing to a web service, which downloads web content into the user's browser which uses an imaging extension to add a reference to that group composition store to the user's profile. This reference could later be removed by browsing to another web service that is allowed to remove references to group composition stores from the user profile. Once the reference is added to the user profile for the group composition store, then whenever the web content enumerates all of the compositions available, the compositions contained within the group composition store will be included (along with compositions in other composition stores associated with the user's profile, such as the default composition store). Thus, whatever compositions happen to be in the group composition store are automatically available to the web content/user. For example, if the user subscribes to People Magazine (making the user a member of the "People magazine subscribers group"), a reference to the people magazine group composition store might be provided to the user's profile. This group composition store might contain issues of People magazine. As new issues come out, these new issues would be added to the People magazine group composition store. Because the user has a reference to the People magazine group composition store in his/her user profile, the new issues of people magazine (represented as compositions in the group composition store) would automatically be a part of the user's personal imaging repository. The user would be able to select them like any other composition available in the user's personal imaging repository and subsequently use them. The user would not need to explicitly choose the group composition store—once a reference thereto is added to the user's profile, it is always a part of the user's personal imaging repository and compositions from it will be enumerated when available compositions are listed for selection by the user through the web content, unless the user removes it. It should be noted that the user would not necessarily be aware that he/she was specifically choosing a composition from the group composition store—the user would just think he/she was choosing a composition.

Note that there may be two or more group composition stores and group graphics stores, with some being inside the firewall and some being outside the firewall. Accordingly, if the imaging client is outside of the firewall, then the available compositions enumerated by the web content for selection by the user would not include compositions in group composition stores that are inside of the firewall.

The use of a group composition store 500 and/or the group graphic store 501 is particularly advantageous for making a set of compositions available to a group of users. For example, a monthly newsletter could be added to the group composition store. This newsletter composition could then be accessed for the purpose of printing, and other manipulations. The group composition store/graphics store makes imaging information automatically available to a user based on his/her affiliation with some group. This affiliation would be indicated in the user profile for each person. Note that there could be several distinct group composition store/graphic stores for each group with which the user is affiliated. As additional imaging information becomes available in these group composition stores, the user would automatically have that imaging information in his/her personal imaging repository because the group composition store is a part of that user's personal imaging repository, via the reference to the group composition store in the user's user profile.

As another example, inventors might imagine sharing patent application information. A patent application comprises (at least) three parts: Descriptive text, claims, and figures. One inventor could work on the descriptive text and then create a composition in the group composition store that references a graphic that contains the descriptive text. Another inventor could do the same thing for the figures. A third inventor could do the same thing for the claims. Because compositions representing these elements are in the group composition store, all of the inventors would have access to them, via their respective personal imaging repositories. If new items are added or updated, all of the inventors would have access to the latest versions.

The group composition store simply makes the same compositions available to a group of people. If two users have user profiles that contain a reference to a group composition store, both users will have access to the compositions stored within that group composition store. If a new composition is added or an existing composition updated in some way, both users will have access to that added/updated composition. The compositions (and the graphics referenced by those compositions) stored within the group composition store become a part of the "personal imaging repository" for each of the users. Note that if the imaging client for a given user is outside the firewall, any group composition store (there can be several) that is located within the firewall will become inaccessible to that imaging client.

Figure 6A:
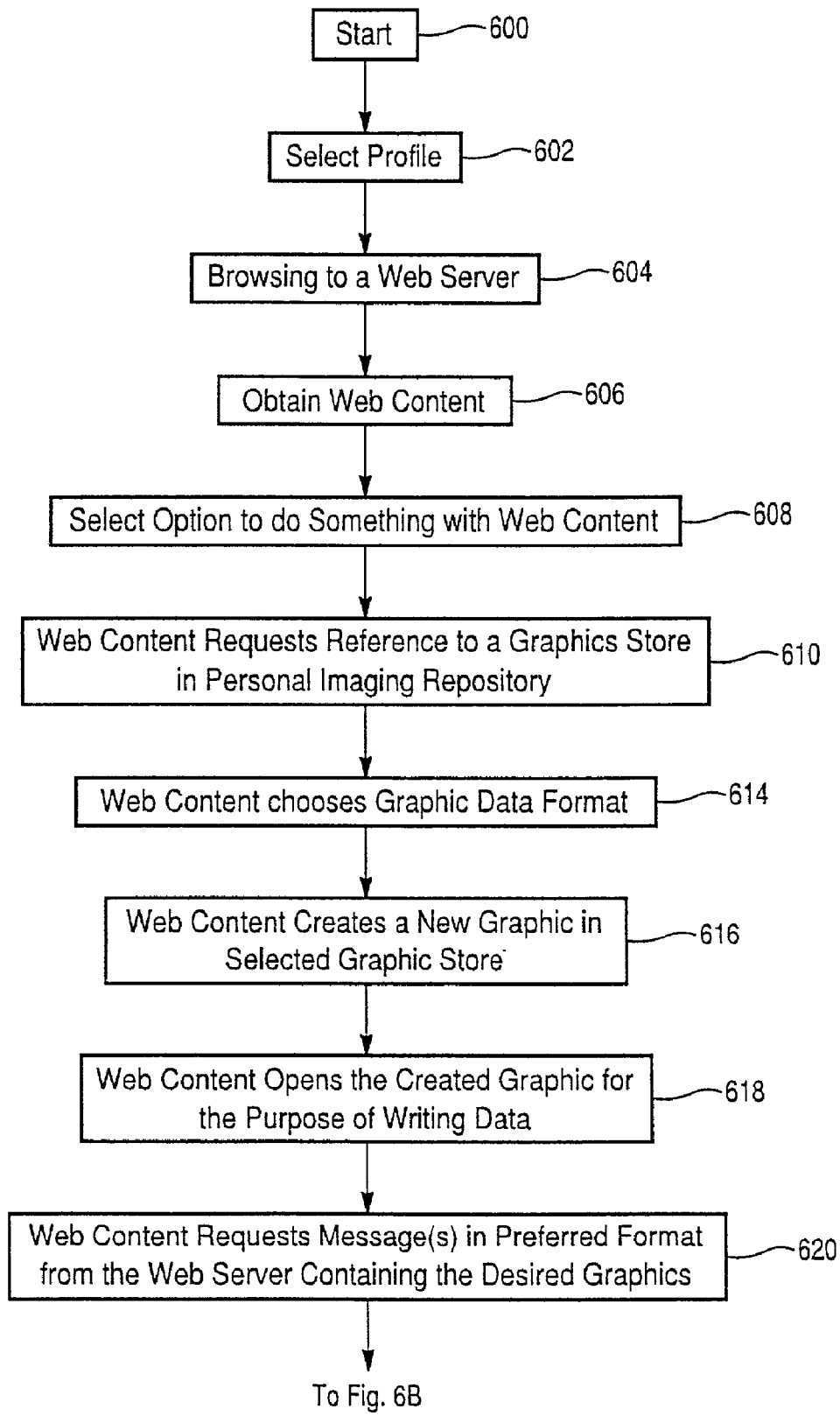

Referring now to FIG. 6A and 6B, one example implementation of the operation of the present invention is illustrated to provide an ease of understanding. The invention is not intended to be limited to this specific sequence of operational steps. In addition, one of ordinary skill in the art would realize that each of the steps could be implemented in other comparable ways.

In FIG. 6A the operation begins at the start block 600, indicating that the imaging client 12 has been activated. Typically, this is accomplished by the user inputting his/her user's login name and password or inserting a card into a generic imaging client. The execution then moves to block 602, wherein a user profile is selected. The details for the selection of the user profile will be discussed in more detail with respect to FIG. 7. In this example, the browser on the imaging client 12 then browses to a supplier web server 30, for example, in block 604. A supplier web server would supply graphics for subsequent processing, possibly at another web service, i.e., a consuming web service.

The operation then moves to block 606, wherein supplier web content from the server 30 is requested and downloaded to the imaging client 12. The foregoing steps of browsing to the web server and obtaining supplier web content, in one embodiment, would comprise the user inputting an appropriate URL for a web page of a web site. The browser 18 at the imaging client 12 would receive this URL input, and in response, transmit an appropriate request (in some cases through a firewall) for the web page to a web server. The web server, for example web server 30, would receive this request and respond by transmitting the desired web page to the web browser. The browser 18 would receive the transmitted web page and display it.

Web pages comprise a series of tags, most of which describe the way that the web page should look, but also include tags to specify hyperlinks to other locations (another web site, web page on the current site, or location within the current page, for example). Conceptually, the web page would include a text portion and one or more hyperlinks, such as a "get document service" hyperlink to provide the graphic for the document. The text portion may include information regarding the document creation service provided by the web server 30, and potentially also information on the cost to use the service and a means for the user to enter payment. The hyperlink is formatted such that, when selected by the user, the browser will transmit an appropriate request back to the web server 30 for the document creation supplier web content, which is then downloaded to the browser 18.

Thus, the supplier web content 16, now residing in the imaging client 12, presents a variety of options for accessing, manipulating and otherwise using the graphics at or accessible by the web server.

The operation then moves to block 608, wherein it is assumed that the user chooses via the hyperlink, or by means of automatic selection, an option to do something with the graphic, such as get the document. The browser 18 receives this user input and transmits an appropriate request to the web server 30 for the document creation web content.

The operation then moves to block 610, wherein the supplier web content requests from the user profile a reference to a graphics store in the user's personal imaging repository. Typically, this would be an opaque reference for reference 68 to a default graphics store 60. To accomplish this, the supplier web content calls a method that is part of the API provided by the imaging extension 22. This method logs into the referenced graphics store. At this time, the web content may determine whether or not the graphic store prefers a particular graphic format and generally what graphic formats are supported by the graphic store. The graphic format doesn't necessarily need to be compatible for any specific purpose, such as printing. It merely needs to be compatible with the graphic store so that the graphic store can operate on the supplied graphic format.

It should be noted that there are two web contents operating, typically sequentially: web content from a supplier web service and web content from a consumer web service. The user adds graphic data supplied from one web service (the supplier web service) to their personal imaging repository, then uses that graphic data by browsing to another web service for processing (the consuming web service). Initially, the supplying web service downloads its web content to the user's browser and uses that web content to add a graphic to the user's personal imaging repository, as discussed in more detail herein. Then the consuming web service downloads its web content to the user's browser and accesses the graphic in the user's personal imaging repository to operate on it. The web content provided by the consuming web service will deliver web content that indicates those data formats supported by the consuming web service. Typically, consuming web services will use JPEG, PNG, GIF formats will use information about the graphic such as size, number of pages, etc. By way of example but not by way of limitation, assume that graphic data is to be processed by a consuming web service, such as a printer web service, because the user has browsed to the printer web service and caused the web content of the printer web service to be downloaded to the browser. The printer web service web content will interact with the graphics store in the user's personal imaging repository 50 and will select a data format with which it is compatible; for a printer web service, typically PDF, PCL, PS, and PCL6. In other words, the consuming web content from the printer web service will "know" (by virtue of its origin) what data format is appropriate/compatible with that printer web service and will query the graphics store to determine if there is a match between the data format that may be used at the consuming printer web service and the data format that is available from the graphics store, and will then make the appropriate selection from the formats available from the graphics store.

This format information could be selected automatically, or manually via an input from the user through a user interface.

In block 614, based on these graphics format options, the consuming web content would choose a graphics format for the graphic on the server 30.

At this or an earlier point the supplier web content would also display a user interface with selectable options that might include a pull-down menu to allow the user to indicate where he/she would like the document saved, i.e., in a graphics store associated with the web service from which the graphic was supplied (which graphic store could then be referenced by a composition in a composition store that is part of the user's personal imaging repository and thereby made a part of the user's personal imaging repository), or in a default graphics store in the user's personal imaging repository. It is better to use the user's default graphic store in the user's personal imaging repository if the web service in question is not always available (or more particularly, the graphic store associated with that web service). Some web services will not have a graphic store or cannot be counted on to reliably provide graphics. For example, a web service representing a camera (such as one that runs on the user's local machine—i.e. the imaging client machine) won't have a graphic store since it is likely that the camera will only be connected to the user's imaging client temporarily.

Assuming that the save option has been selected and the graphics store selected either manually or automatically, the operation would then move to block 616 wherein the supplier web content via appropriate opaque references would create a new graphic in the selected graphics store, which could be the default graphics store 60 referenced by the user profile. The operation then moves to block 618, wherein the web content opens the created graphic in the default graphics store 60 for the purpose of writing data.

The operation then moves to block 620, wherein the web content generates a message or a sequence of messages requesting the desired graphic data from the web server 30 in the appropriate format. The operation then moves to block 622, wherein the web content receives one or more messages in the selected format and writes, via the imaging extension API, the graphic data in these messages to the open graphic in the graphics store.

More specifically, the imaging extension 22 receives the generic access requests from the web content and responds with a method in its API using appropriate opaque references in the preferred embodiment, to cause the data in the message(s) to be stored in the graphics store 60. As noted previously, this may involve a communication over a communication link to a remote graphics store, or it may simply involve storage to a designated section of a hard drive on the imaging client 12, both of which may be in the personal imaging repository for the user. Note that since the HTTP protocol may be used, the extension may communicate these messages containing the graphic through the firewall 14. The graphics store responds to these commands by storing the messages in one or more graphics files.

The operation then moves to block 624, wherein the supplier web content retains an opaque reference through the imaging extension API to the newly created graphic and then closes the open graphic. The operation then moves to block 626, wherein the web content retrieves a reference 67 in the user profile for a default composition store. This default composition store 62 may be determined in accordance with a predetermined criteria set by the user or may be set automatically.

The operation then moves to block 628, wherein the supplier web content, through the opaque references from the imaging extension API, logs into the default composition store 62 and creates a composition within the composition store 62. The operation then moves to block 630, wherein the supplier web content, through the opaque references from the imaging extension API, adds a reference to the newly created graphic in the graphic store 60 to the composition just created in the composition store 62.

The operation then moves to block 632, wherein the supplier web content, through the opaque references from the imaging extension API, changes the reference 69 in the user profile 64 for the default composition to refer to the composition just created in the composition store 62. The operation then moves to block 634, wherein the supplier web content directs the browser to initiate the use initially selected by the user for the graphic, for example printing. Because the newly created composition is set as the default composition, it will be selected and used by follow-on web services, e.g., printers, to perform services thereon.

Figure 7:
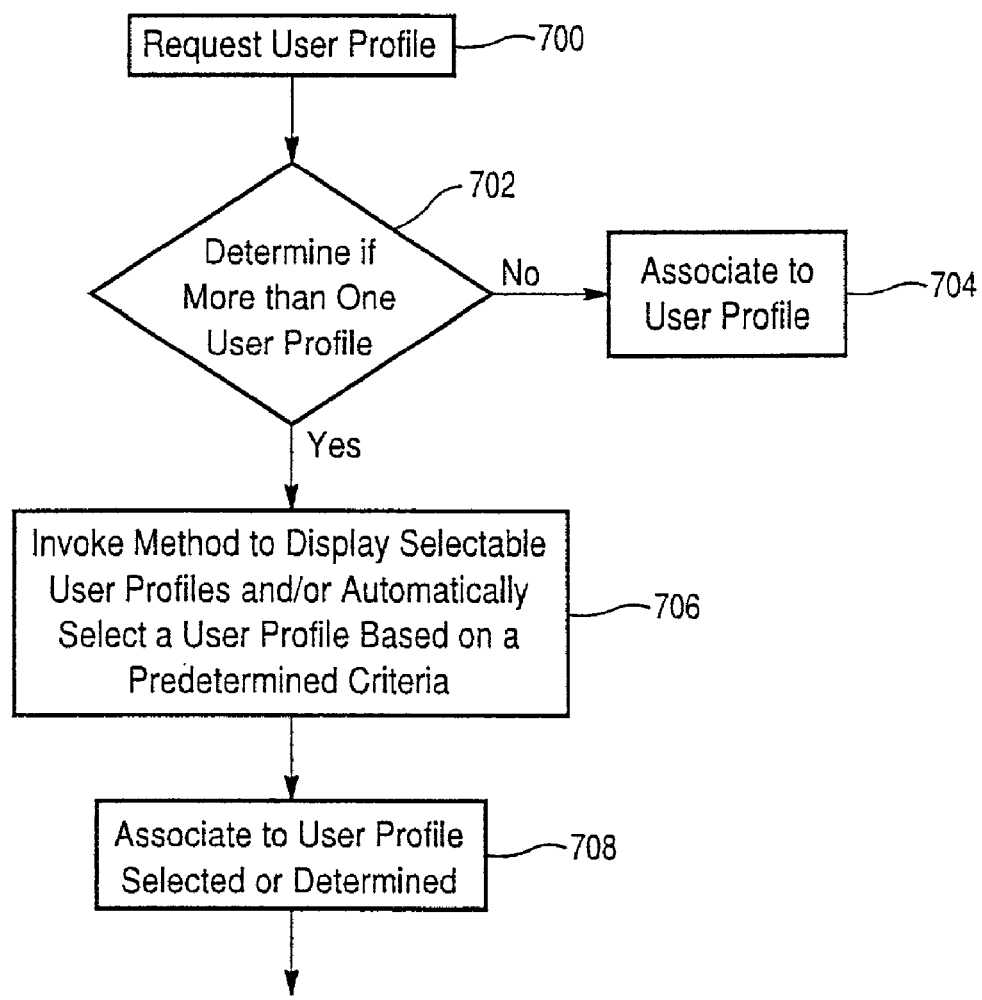
FIG. 7 is a flow chart illustrating the preferred functionality for selecting a profile per FIG. 6.

Referring to FIG. 7, there are disclosed details for one example implementation of block 602 in FIG. 6. In FIG. 7 the initial operation in block 700 is for a request to be made by the supplier web content to the imaging extension API for user identification information regarding available user profiles. As with other operations, this request would actually be transmitted through the imaging extension's API that would operate to provide opaque references to the user profile and resources therein back to the web content. These opaque references would permit an association of the web content commands to the appropriate resources at the imaging client and with the appropriate personal user repository. The operation then moves to block 702, wherein it is determined if more than one user profile is available for selection. If the determination is NO, then the operation moves to block 704, wherein the single active user profile is associated through the imaging extension API to the web content. If the determination is YES, then the operation moves to block 706, wherein a method is invoked for determining the correct user profile. By way of example, this method may comprise displaying a user interface with buttons to allow the selection of one from a plurality of available user profiles. Alternatively or in addition, the method invoked may default to a particular user profile selected earlier by the user or selected based on a predetermined criteria, such as whether the imaging client is within a firewall, or based on which machine the user has activated as the imaging client 12.

The operation then moves to block 708, wherein the user profile selected or automatically determined is associated through the imaging extension API with the web content. The process described in FIG. 7 may also be performed on behalf of the web content by the imaging extension.

Figure 8:
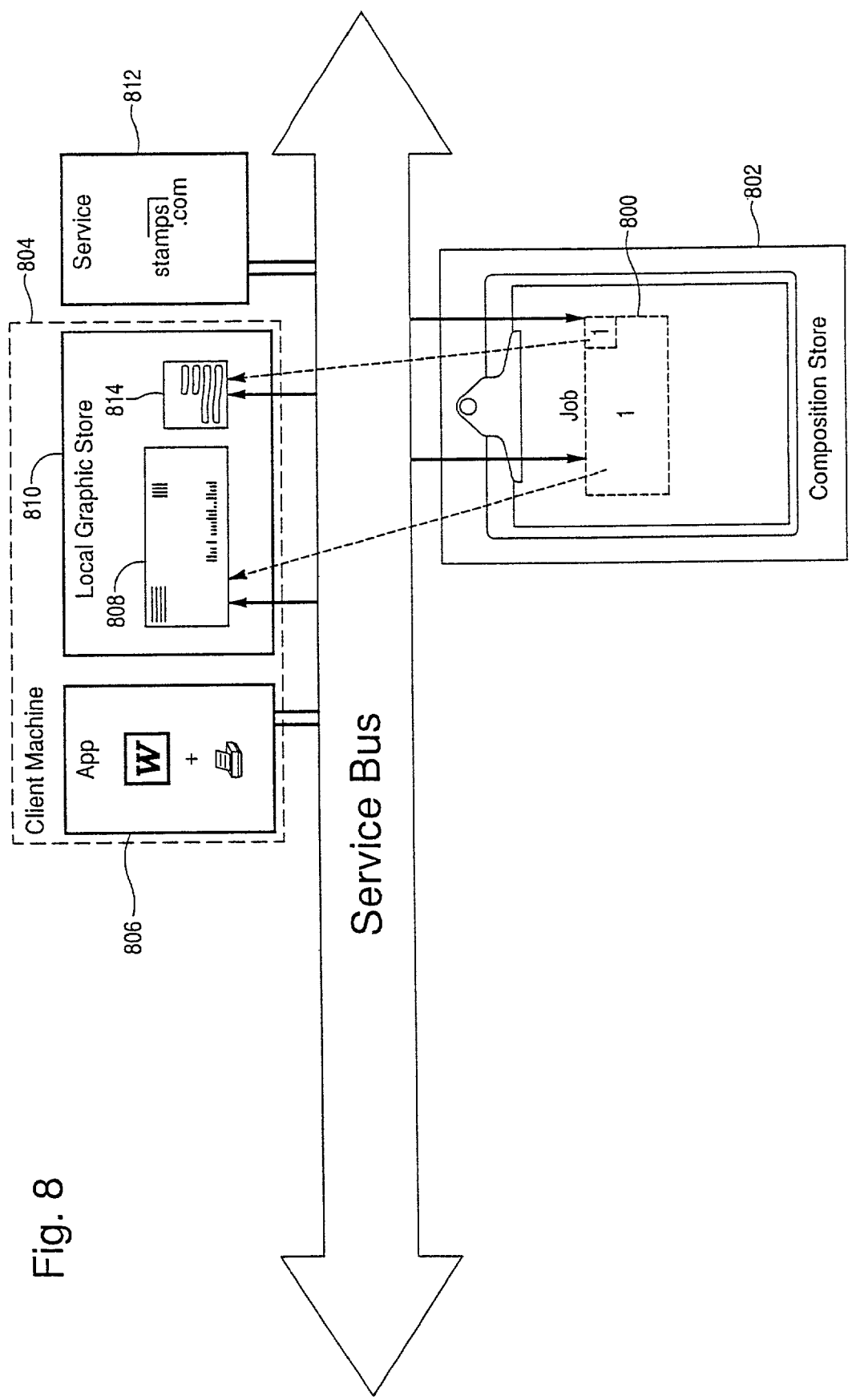
FIG. 8 is a schematic diagram illustrating the operation of the invention for one example at a very high level.

Referring now to FIG. 8, there is shown a schematic example of the operation of the present invention to create, address and stamp an envelope. FIG. 8 shows a single composition 800 that references two graphics—one for an envelope 808 and one for a stamp 814. The graphic of the envelope 808 includes a sending address and a destination address. These are not necessarily the same graphic—but for simplicity they are part of the same graphic (the envelope graphic). The graphic of the envelope 808 may be generated from a document using a desktop application 806 (for example, Microsoft Word) and a "web imaging printer" (an operating system print destination that captures print data from the application when printing and conveys that information into the user's personal imaging repository) and placed in the user's default graphic store 810. The stamp graphic 814 shown in the figure may be generated by a stamp web service 812 and placed in the user's default graphic store 810. Presumably, (although not specifically depicted in the diagram), the envelop graphic may exist first.

In operation, the user creates the envelop graphic with the "web imaging printer" along with the corresponding composition 800 from the application 806. After the envelope graphic 808 and composition 800 are created using the application 806 and the web imaging printer and placed in the user's default graphics store 810, the user browses to a stamp service web site 812 and purchases a stamp. The stamp service web site 812 generates image data corresponding to a stamp (typically a barcode for an electronic stamp) and, using stamp service web site web content, places the image data in a graphic 814 within the user's default graphic store 810. Having accomplished this, the stamp service web content then adds the graphic 814 to the envelope composition 800 in a location appropriate for a stamp. Thus, the diagram illustrates one composition 800 referencing two graphics 808 and 814. This composition could then subsequently be printed—with the stamp.

Although the foregoing description was made in the context of one imaging client 12 and two server machines 30 and 32 within the firewall, and two server machines 40 and 42 outside the firewall for ease of explanation, the preferred implementation would likely involve many server machines to which the client machine has access and can communicate. For better readability, "a" client machine or server machine has sometimes been referred to. However, it should be understood that the use of "a" also refers to "one or more".

It should be noted that although the flow charts provided herein shows a specific order, it is understood that the order of these steps may differ from what is depicted. Also, two or more steps may be performed concurrently or with partial concurrence. Such variation will depend on the software and hardware systems chosen and generally on designer choice. It is understood that all such variations are within the scope of the invention. It is also to be understood that one or more of the steps may be performed or implemented by a programmed machine, or by a hardwired device, or manually. It should also be understood that many of the aspects of the aspects of the present invention are independent of, and may be implemented independently of the API disclosed herein. For example, although the use of an imaging extension is preferred in order to provide an interface between web content and imaging system resources, many aspect of the present invention may be implemented without using an imaging extension.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A system for web based imaging comprising:
   at least one graphic store for storing a plurality of different graphics;
   a networked and autonomous group composition store for storing and providing imaging clients access to a plurality of compositions, with each different composition referencing at least one graphic in the at least one graphic store that is external to the group composition store and including information on a placement of each referenced graphic on a canvas, wherein at least two of the compositions reference the same graphic in the same graphic store without duplicating the graphic; and
   a plurality of different user profiles that are accessed from at least one user profile store, each for a different imaging client, with each user profile including a reference to the group composition store, wherein the profile store is networked and autonomous.

2. The system as defined in claim 1, further comprising:
a default graphics store for at least one of the imaging clients;
a default composition store for the at least one imaging client, including a composition therein with a reference to a graphic within a graphics store; and
wherein the user profile for the at least one imaging client includes a reference to the default graphic stare and the default composition store.

3. The system as defined in claim 1, wherein one or more of the user profiles include a reference to a default composition within said group composition store.

4. The system as defined in claim 1, further comprising:
a firewall protecting said plurality of imaging clients; and
wherein at least one composition in said group composition store references a graphic outside of said firewall.

5. The system as defined in claim 1, wherein the group composition store contains a method that prevent at least selected ones of said imaging clients from deleting or modifying at least one composition in the group composition store.

6. The system as defined in claim 1, further comprising a web extension that will enumerate compositions stored in the group composition store as available to the imaging client.

7. A program product including machine readable program code for implementing:
at least one graphic store for storing a plurality of different graphics;
a networked and autonomous group composition store for storing and providing imaging clients access to a plurality of compositions, with each different composition referencing at least one graphic in the at least one graphic store that is external to the group composition store and including information on a placement of each referenced graphic on a canvas, wherein at least two of the compositions reference the same graphic in the same graphic store without duplicating the graphic; and
a plurality of different user profiles that are accessed from at least one user profile store, each for a different imaging client with each user profile including a reference to the group composition store, wherein the profile store is networked and autonomous.

8. The program product as defined in claim 7, further comprising program code for implementing:
a default graphics store for at least one of the imaging clients;
a default composition store for the at least one imaging client, including a composition therein with a reference to a graphic within a graphics store; and
wherein the user profile for the at least one imaging client includes a reference to the default graphic store and the default composition store.

9. The program product as defined in claim 7, wherein the program code for one or more of the user profiles include a reference to a default composition within said group composition store.

10. The program product as defined in claim 7, further comprising program code for implementing:
a firewall protecting said plurality of imaging clients; and
wherein at least one composition in said group composition store references a graphic outside of said firewall.

11. The program product as defined in claim 7, wherein the program code for the group composition store contains a method that prevent at least selected ones of said imaging clients from deleting or modifying at least one composition in the group composition store.

12. The program product as defined in claim 7, further comprising program code for implementing a web extension that will enumerate compositions stored in the group composition store as available to the imaging client.

* * * * *

UNITED STATES PATENT AND TRADEMARK OFFICE
CERTIFICATE OF CORRECTION

PATENT NO.         : 7,073,131 B2                                    Page 1 of 1
APPLICATION NO.    : 09/923957
DATED              : July 4, 2006
INVENTOR(S)        : Shell S. Simpson et al.

It is certified that error appears in the above-identified patent and that said Letters Patent is hereby corrected as shown below:

On the Title page, in field (73), in "Assignee", in column 1, line 2, delete "I.P." and insert -- L.P. --, therefor.

In column 43, line 8, in Claim 2, delete "stare" and insert -- store --, therefor.

In column 44, line 3, in Claim 7, delete "client" and insert -- client, --, therefor.

Signed and Sealed this

Eleventh Day of August, 2009

David J. Kappos
*Director of the United States Patent and Trademark Office*